US008896929B2

(12) United States Patent
Baba et al.

(10) Patent No.: US 8,896,929 B2
(45) Date of Patent: Nov. 25, 2014

(54) PROJECTION ZOOM LENS AND PROJECTION TYPE DISPLAY DEVICE

(71) Applicant: FUJIFILM Corporation, Tokyo (JP)

(72) Inventors: Tomoyuki Baba, Saitama-ken (JP); Masaru Amano, Saitama-ken (JP); Akiko Nagahara, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/263,312

(22) Filed: Apr. 28, 2014

(65) Prior Publication Data

US 2014/0226219 A1 Aug. 14, 2014

Related U.S. Application Data

(63) Continuation of application No. PCT/JP2012/006587, filed on Oct. 15, 2012.

(30) Foreign Application Priority Data

Oct. 26, 2011 (JP) .................................. 2011-234549

(51) Int. Cl.
*G02B 15/14* (2006.01)
*G02B 15/177* (2006.01)
*G02B 15/04* (2006.01)
*G02B 13/00* (2006.01)

(52) U.S. Cl.
CPC ............. *G02B 15/177* (2013.01); *G02B 15/04* (2013.01); *G02B 13/009* (2013.01); *G02B 15/14* (2013.01)
USPC .......................................... 359/682; 359/679

(58) Field of Classification Search
CPC ...... G02B 15/177; G02B 15/04; G02B 13/04; G02B 13/009
USPC ................... 359/676, 679, 680, 682; 348/345
See application file for complete search history.

(56) References Cited

U.S. PATENT DOCUMENTS

| 7,558,002 | B2 * | 7/2009 | Yamada et al. ................ 359/676 |
| 7,715,111 | B2 * | 5/2010 | Yamamoto et al. ............ 359/684 |
| 8,328,369 | B2 * | 12/2012 | Amano ......................... 353/101 |
| 2005/0036207 | A1 | 2/2005 | Yamasaki et al. |
| 2009/0219624 | A1 | 9/2009 | Yamamoto et al. |

FOREIGN PATENT DOCUMENTS

| JP | 2001-350096 | 12/2001 |
| JP | 2005-062226 | 3/2005 |
| JP | 2009-210594 | 9/2009 |
| JP | 4695744 | 6/2011 |

OTHER PUBLICATIONS

International Search Report, PCT/JP2012/006587, Jan. 15, 2013.

\* cited by examiner

*Primary Examiner* — David N Spector
(74) *Attorney, Agent, or Firm* — Young & Thompson

(57) ABSTRACT

A negative first lens group, a positive second lens group, a negative third lens group, a positive fourth lens group, a negative fifth lens group, and a positive sixth lens group are disposed in this order from the magnification side. The reduction side is made telecentric. While changing magnification, the second lens group through the fifth lens group are moved, and the first lens group and the sixth lens group are fixed. Predetermined conditional expressions are satisfied.

13 Claims, 21 Drawing Sheets

FIG.8
EXAMPLE 8
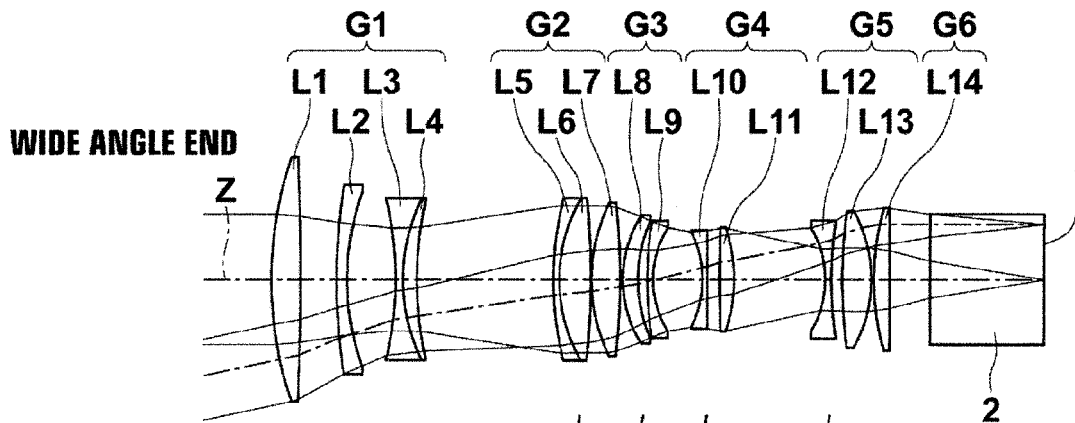
WIDE ANGLE END
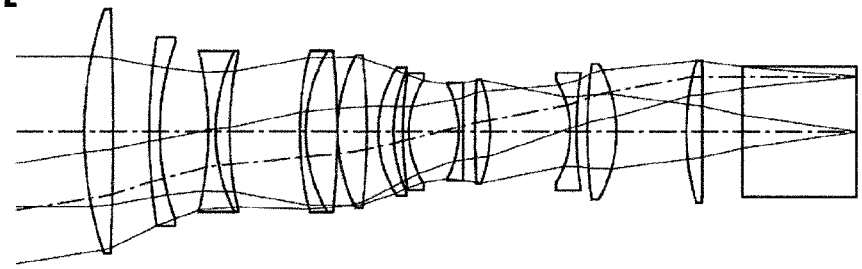
INTERMEDIATE
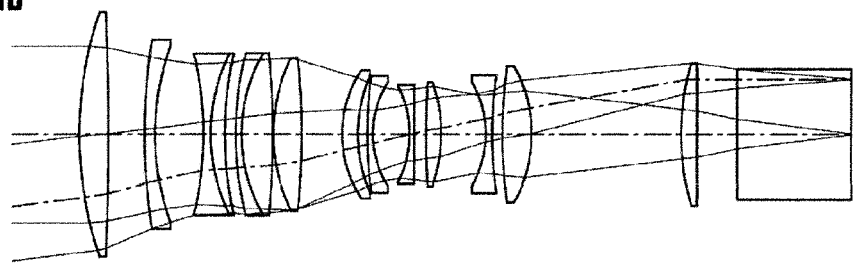
TELEPHOTO END

FIG.11
EXAMPLE 1
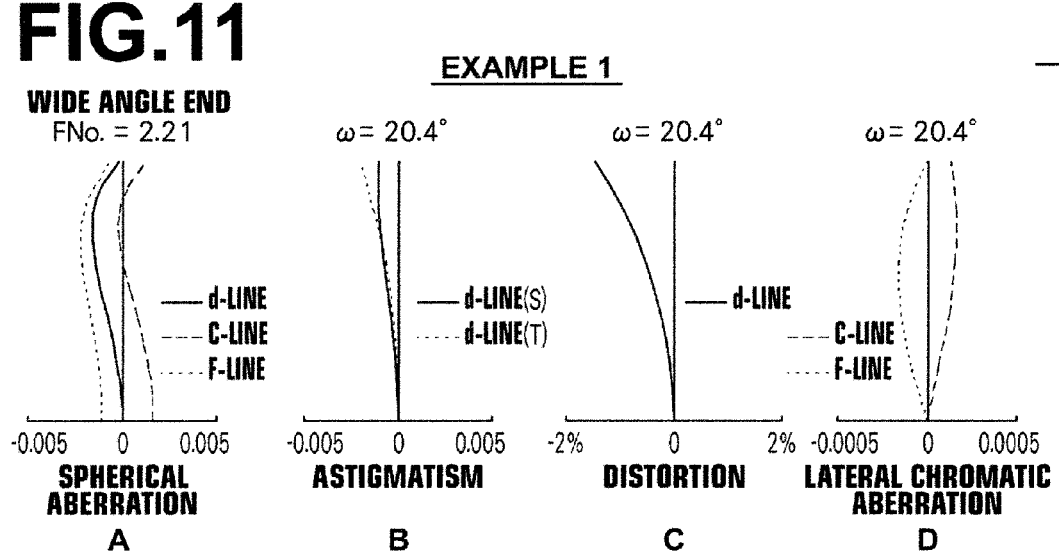
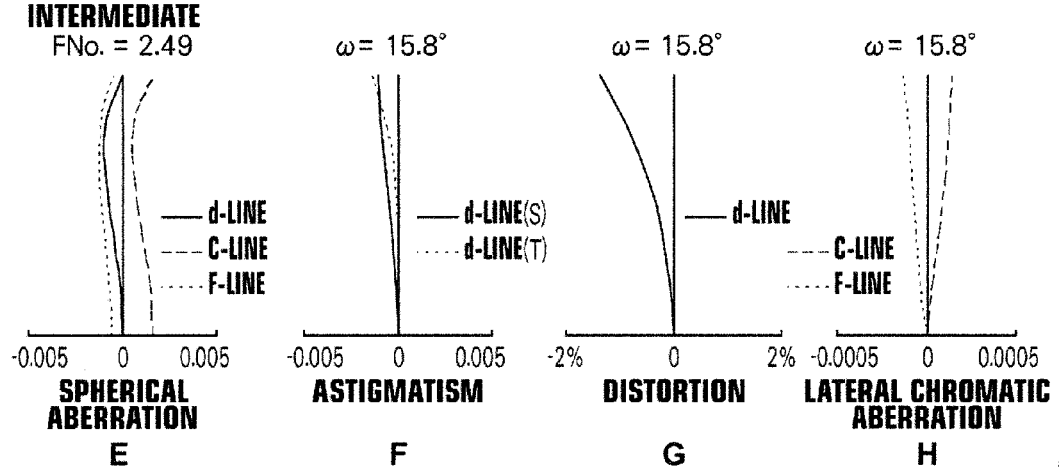
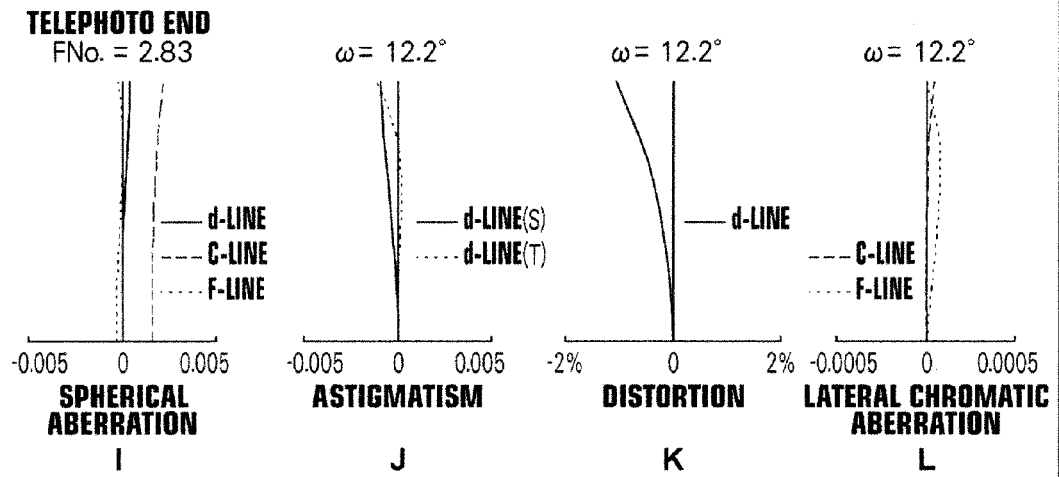

FIG.12

EXAMPLE 2

WIDE ANGLE END

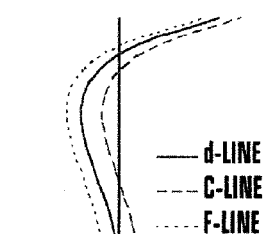
FNo. = 1.6
SPHERICAL ABERRATION
d-LINE / C-LINE / F-LINE
A

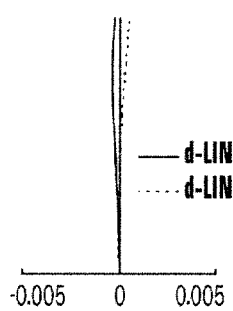
ω = 25.6°
ASTIGMATISM
d-LINE(S) / d-LINE(T)
B

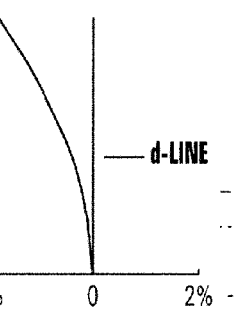
ω = 25.6°
DISTORTION
d-LINE
C

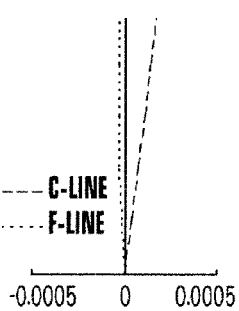
ω = 25.6°
LATERAL CHROMATIC ABERRATION
C-LINE / F-LINE
D

INTERMEDIATE

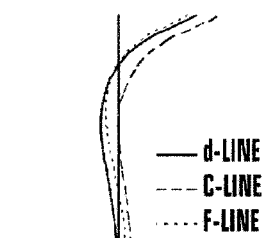
FNo. = 1.76
SPHERICAL ABERRATION
d-LINE / C-LINE / F-LINE
E

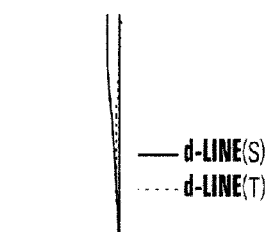
ω = 19.5°
ASTIGMATISM
d-LINE(S) / d-LINE(T)
F

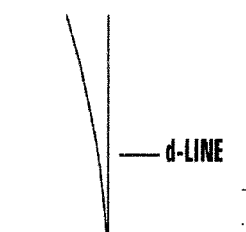
ω = 19.5°
DISTORTION
d-LINE
G

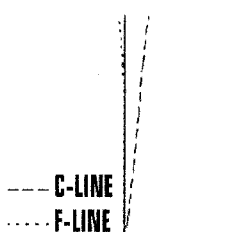
ω = 19.5°
LATERAL CHROMATIC ABERRATION
C-LINE / F-LINE
H

TELEPHOTO END

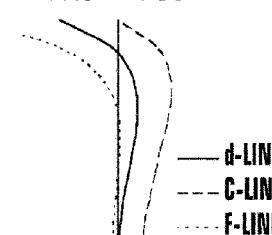
FNo. = 1.89
SPHERICAL ABERRATION
d-LINE / C-LINE / F-LINE
I

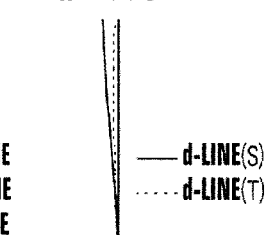
ω = 14.6°
ASTIGMATISM
d-LINE(S) / d-LINE(T)
J

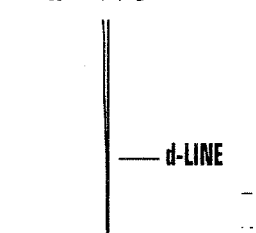
ω = 14.6°
DISTORTION
d-LINE
K

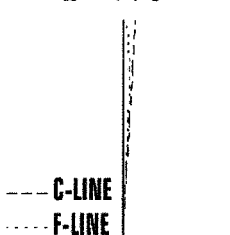
ω = 14.6°
LATERAL CHROMATIC ABERRATION
C-LINE / F-LINE
L

FIG.13
EXAMPLE 3
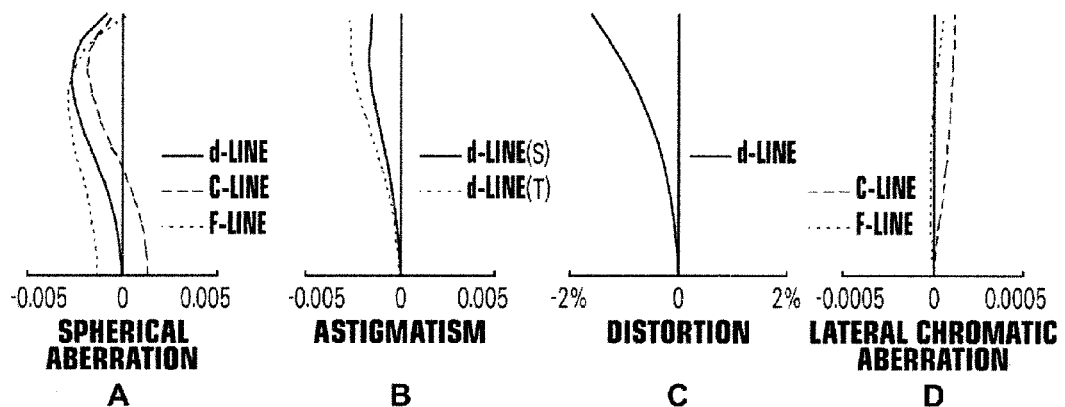
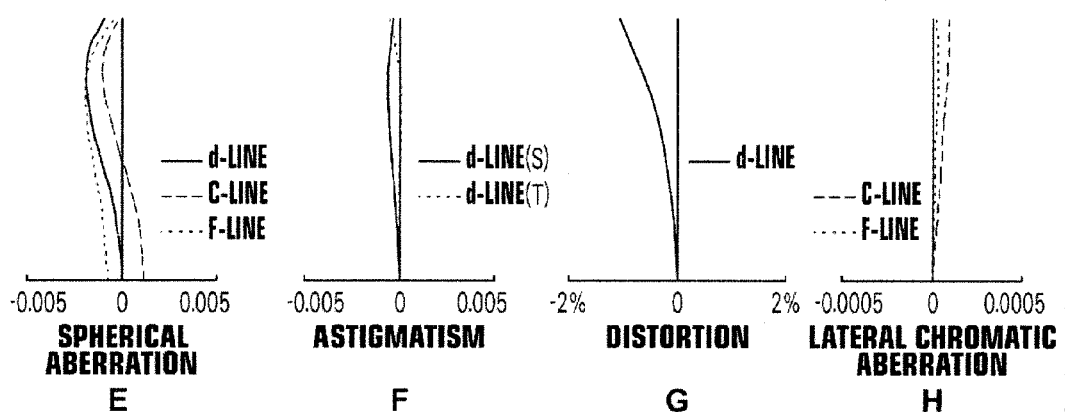
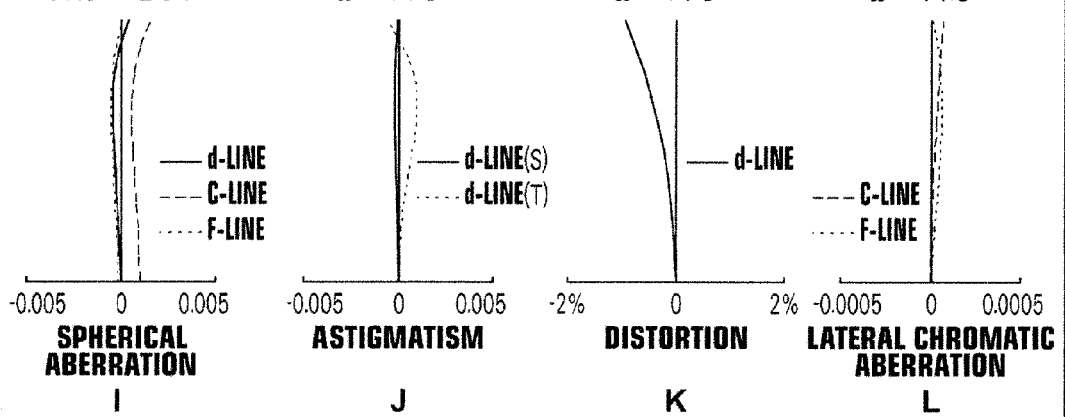

FIG.14
EXAMPLE 4

WIDE ANGLE END

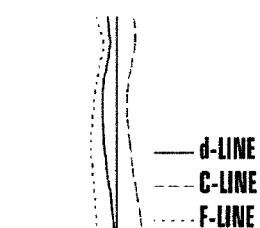
FNo. = 1.8
— d-LINE
— — C-LINE
····· F-LINE
-0.005   0   0.005
SPHERICAL ABERRATION
A

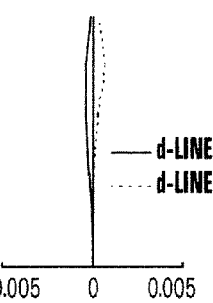
ω = 18.8°
— d-LINE(S)
····· d-LINE(T)
-0.005   0   0.005
ASTIGMATISM
B

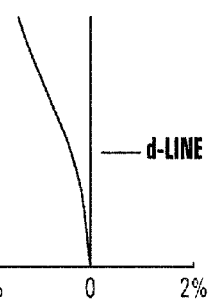
ω = 18.8°
— d-LINE
-2%   0   2%
DISTORTION
C

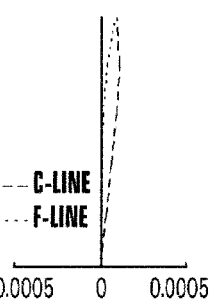
ω = 18.8°
— — C-LINE
····· F-LINE
-0.0005   0   0.0005
LATERAL CHROMATIC ABERRATION
D

INTERMEDIATE

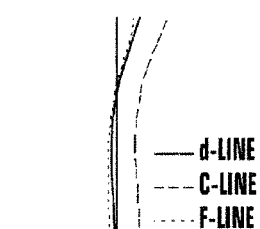
FNo. = 2.02
— d-LINE
— — C-LINE
····· F-LINE
-0.005   0   0.005
SPHERICAL ABERRATION
E

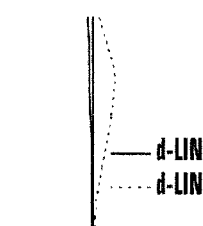
ω = 14.9°
— d-LINE(S)
····· d-LINE(T)
-0.005   0   0.005
ASTIGMATISM
F

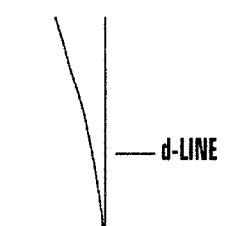
ω = 14.9°
— d-LINE
-2%   0   2%
DISTORTION
G

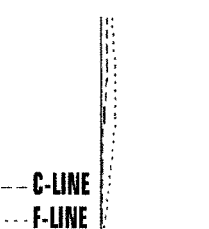
ω = 14.9°
— — C-LINE
····· F-LINE
-0.0005   0   0.0005
LATERAL CHROMATIC ABERRATION
H

TELEPHOTO END

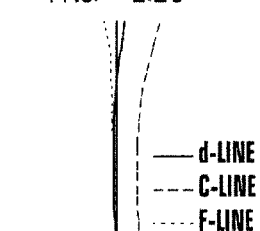
FNo. = 2.26
— d-LINE
— — C-LINE
····· F-LINE
-0.005   0   0.005
SPHERICAL ABERRATION
I

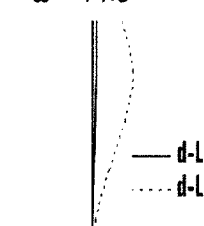
ω = 11.9°
— d-LINE(S)
····· d-LINE(T)
-0.005   0   0.005
ASTIGMATISM
J

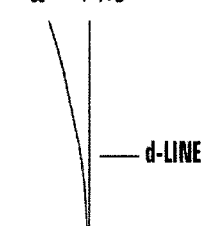
ω = 11.9°
— d-LINE
-2%   0   2%
DISTORTION
K

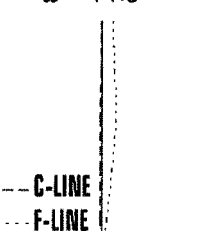
ω = 11.9°
— — C-LINE
····· F-LINE
-0.0005   0   0.0005
LATERAL CHROMATIC ABERRATION
L

FIG.15
EXAMPLE 5
WIDE ANGLE END
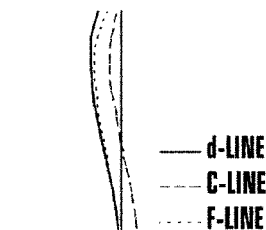
FNo. = 2
SPHERICAL ABERRATION
A
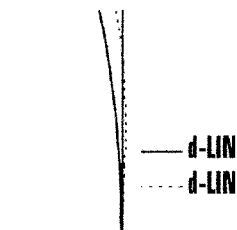
ω = 11.3°
ASTIGMATISM
B
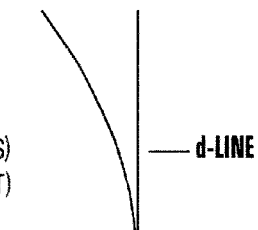
ω = 11.3°
DISTORTION
C
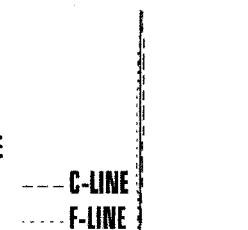
ω = 11.3°
LATERAL CHROMATIC ABERRATION
D
INTERMEDIATE
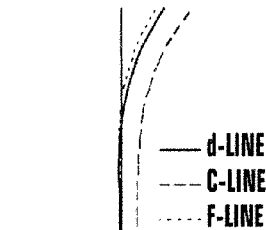
FNo. = 2.2
SPHERICAL ABERRATION
E
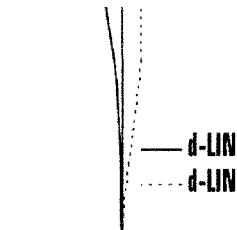
ω = 8.9°
ASTIGMATISM
F
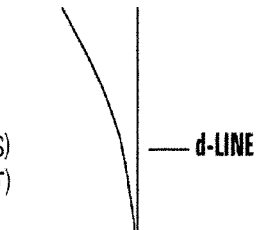
ω = 8.9°
DISTORTION
G
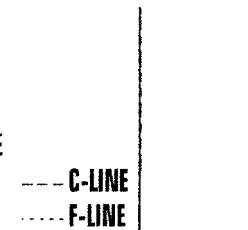
ω = 8.9°
LATERAL CHROMATIC ABERRATION
H
TELEPHOTO END
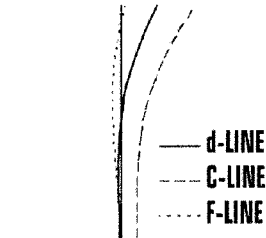
FNo. = 2.55
SPHERICAL ABERRATION
I
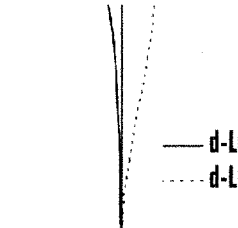
ω = 7°
ASTIGMATISM
J
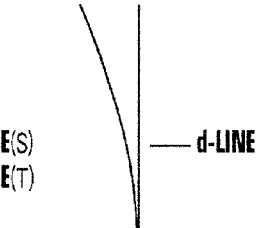
ω = 7°
DISTORTION
K
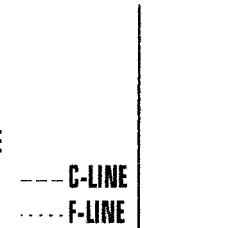
ω = 7°
LATERAL CHROMATIC ABERRATION
L

FIG.16
EXAMPLE 6
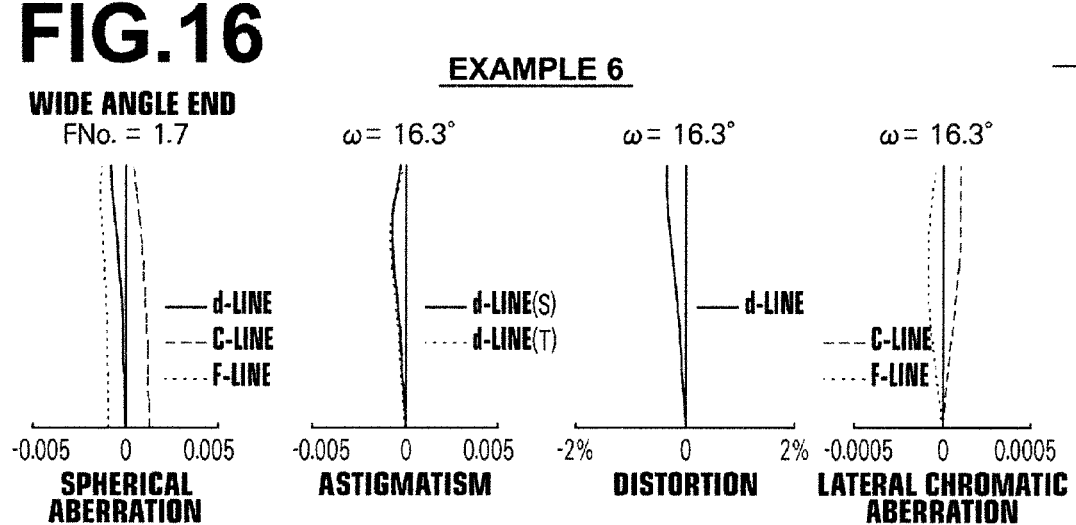
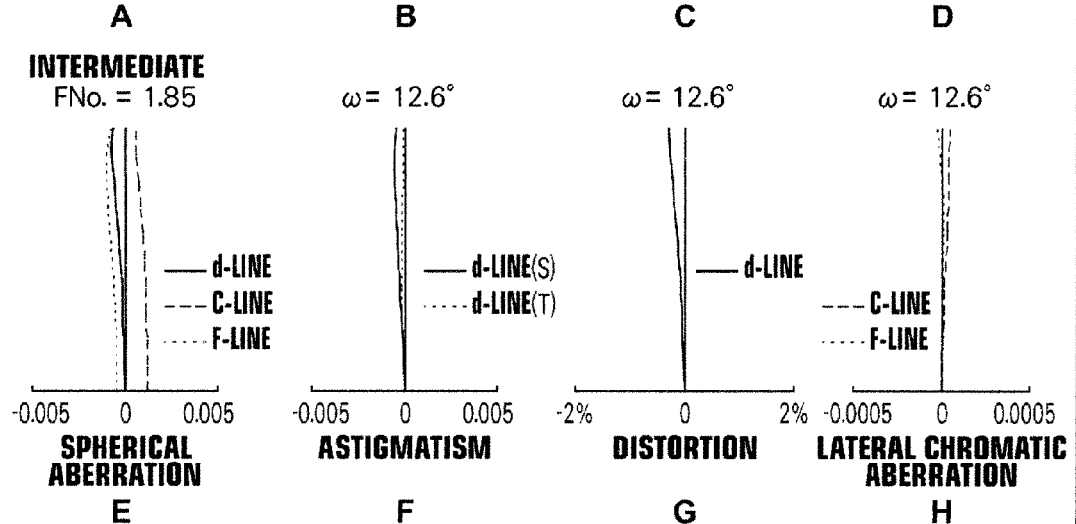
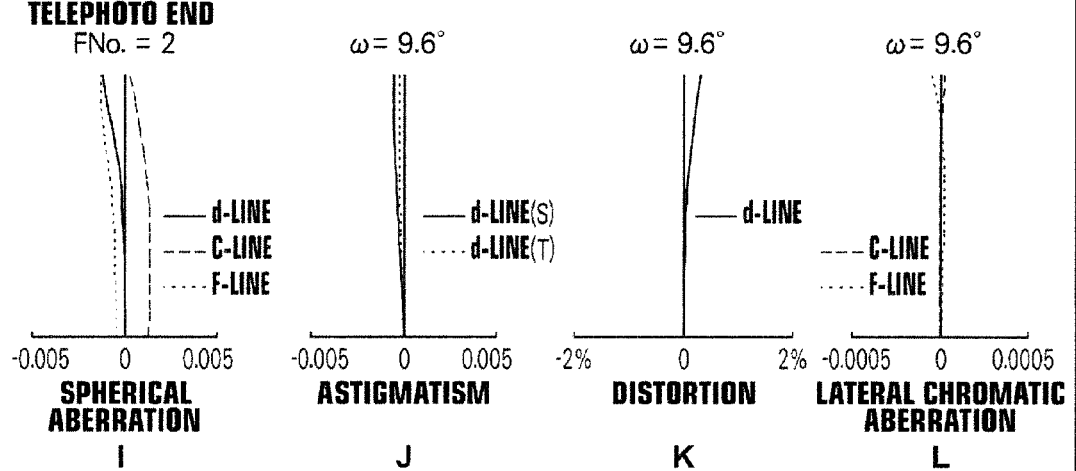

FIG.17
EXAMPLE 7

WIDE ANGLE END

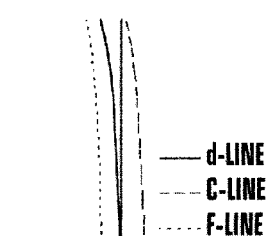
FNo. = 1.7
SPHERICAL ABERRATION
A
— d-LINE
--- C-LINE
····· F-LINE

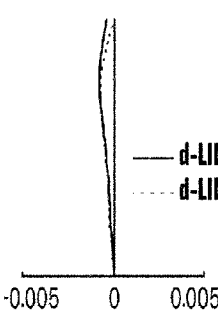
ω = 16.2°
ASTIGMATISM
B
— d-LINE(S)
····· d-LINE(T)

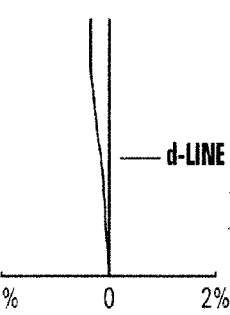
ω = 16.2°
DISTORTION
C
— d-LINE

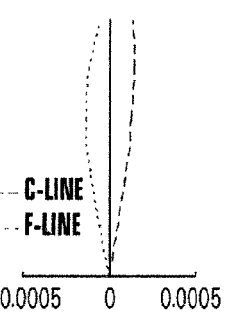
ω = 16.2°
LATERAL CHROMATIC ABERRATION
D
--- C-LINE
····· F-LINE

INTERMEDIATE

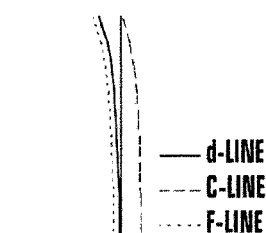
FNo. = 1.87
SPHERICAL ABERRATION
E
— d-LINE
--- C-LINE
····· F-LINE

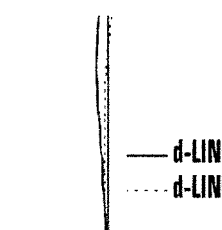
ω = 12.6°
ASTIGMATISM
F
— d-LINE(S)
····· d-LINE(T)

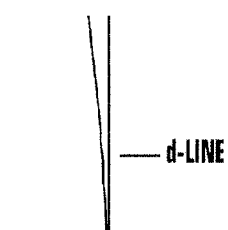
ω = 12.6°
DISTORTION
G
— d-LINE

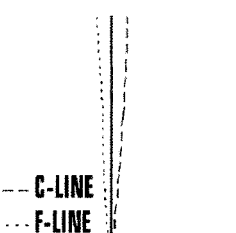
ω = 12.6°
LATERAL CHROMATIC ABERRATION
H
--- C-LINE
····· F-LINE

TELEPHOTO END

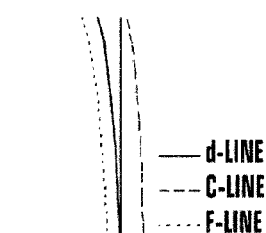
FNo. = 2.01
SPHERICAL ABERRATION
I
— d-LINE
--- C-LINE
····· F-LINE

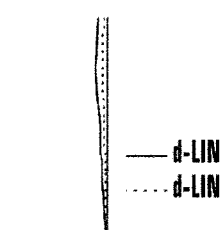
ω = 9.6°
ASTIGMATISM
J
— d-LINE(S)
····· d-LINE(T)

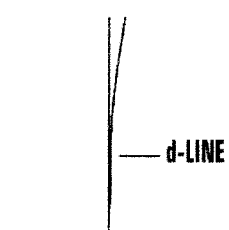
ω = 9.6°
DISTORTION
K
— d-LINE

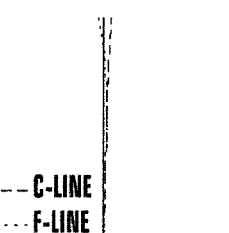
ω = 9.6°
LATERAL CHROMATIC ABERRATION
L
--- C-LINE
····· F-LINE

FIG.18
EXAMPLE 8
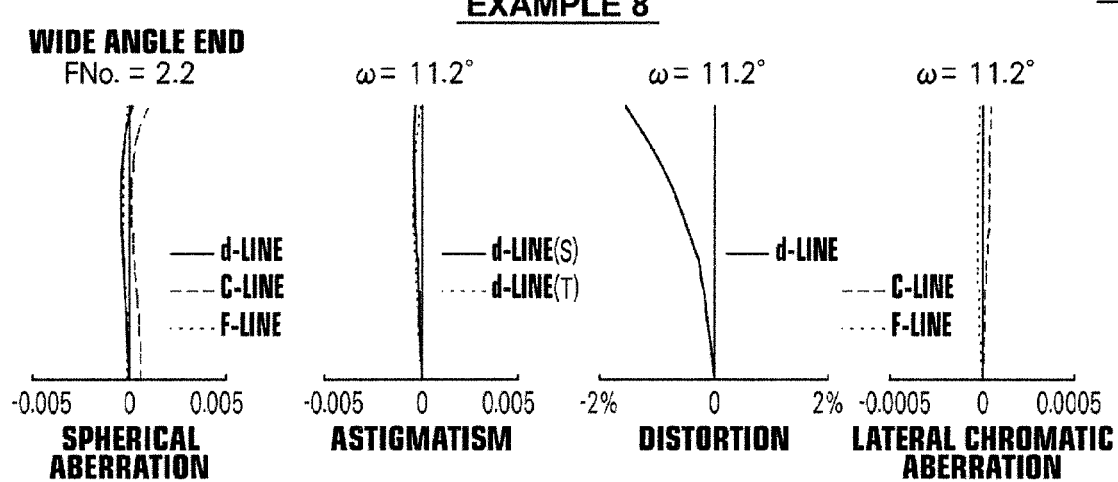
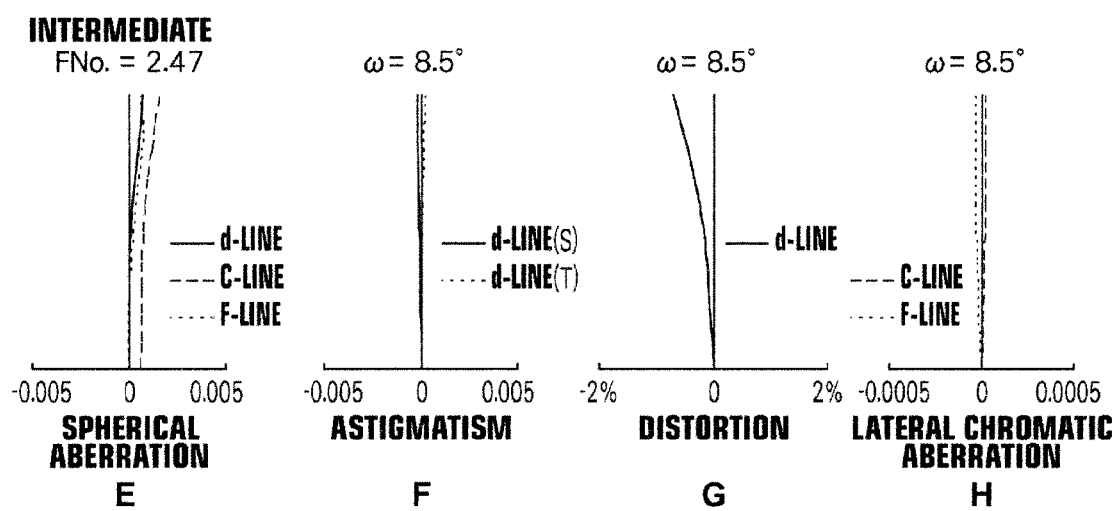
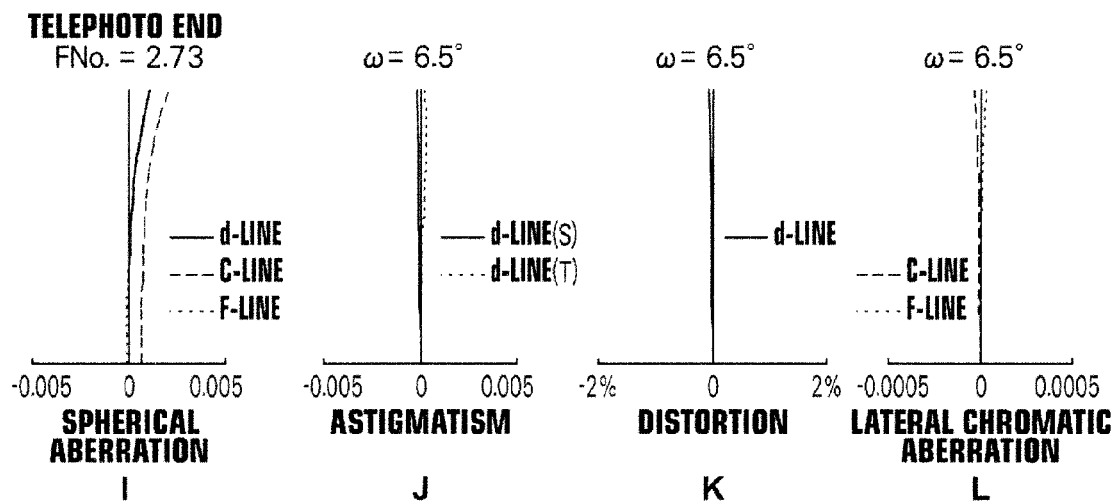

FIG.19

EXAMPLE 9

WIDE ANGLE END

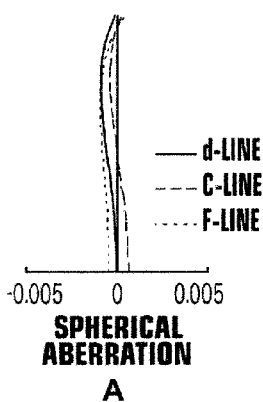
FNo. = 2.2
-0.005 0 0.005
SPHERICAL ABERRATION
A
— d-LINE
--- C-LINE
····· F-LINE

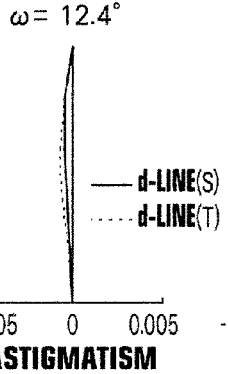
ω = 12.4°
-0.005 0 0.005
ASTIGMATISM
B
— d-LINE(S)
····· d-LINE(T)

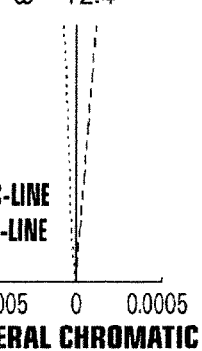
ω = 12.4°
-2% 0 2%
DISTORTION
C
— d-LINE

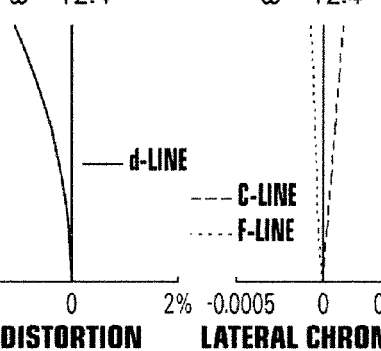
ω = 12.4°
-0.0005 0 0.0005
LATERAL CHROMATIC ABERRATION
D
--- C-LINE
····· F-LINE

INTERMEDIATE

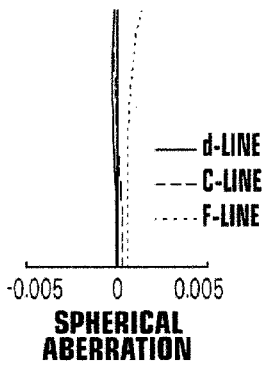
FNo. = 2.51
-0.005 0 0.005
SPHERICAL ABERRATION
E
— d-LINE
--- C-LINE
····· F-LINE

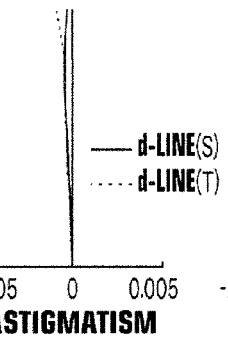
ω = 9.5°
-0.005 0 0.005
ASTIGMATISM
F
— d-LINE(S)
····· d-LINE(T)

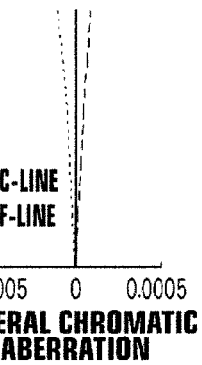
ω = 9.5°
-2% 0 2%
DISTORTION
G
— d-LINE

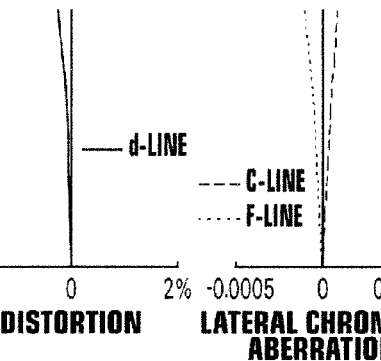
ω = 9.5°
-0.0005 0 0.0005
LATERAL CHROMATIC ABERRATION
H
--- C-LINE
····· F-LINE

TELEPHOTO END

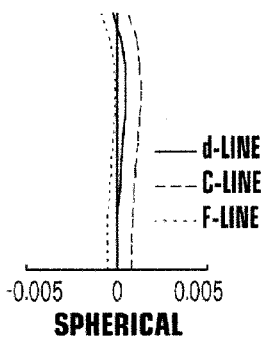
FNo. = 2.98
-0.005 0 0.005
SPHERICAL ABERRATION
I
— d-LINE
--- C-LINE
····· F-LINE

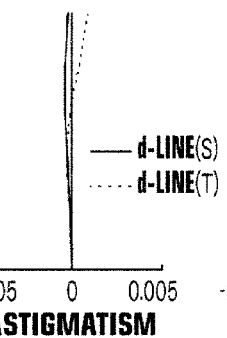
ω = 7.2°
-0.005 0 0.005
ASTIGMATISM
J
— d-LINE(S)
····· d-LINE(T)

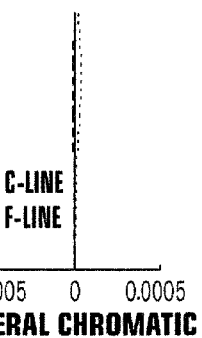
ω = 7.2°
-2% 0 2%
DISTORTION
K
— d-LINE

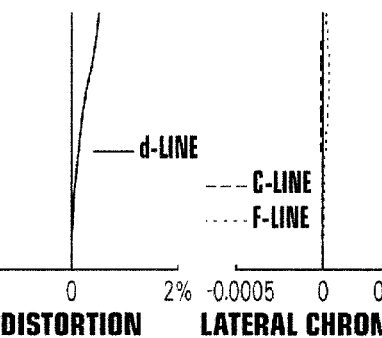
ω = 7.2°
-0.0005 0 0.0005
LATERAL CHROMATIC ABERRATION
L
--- C-LINE
····· F-LINE

FIG.20
EXAMPLE 10
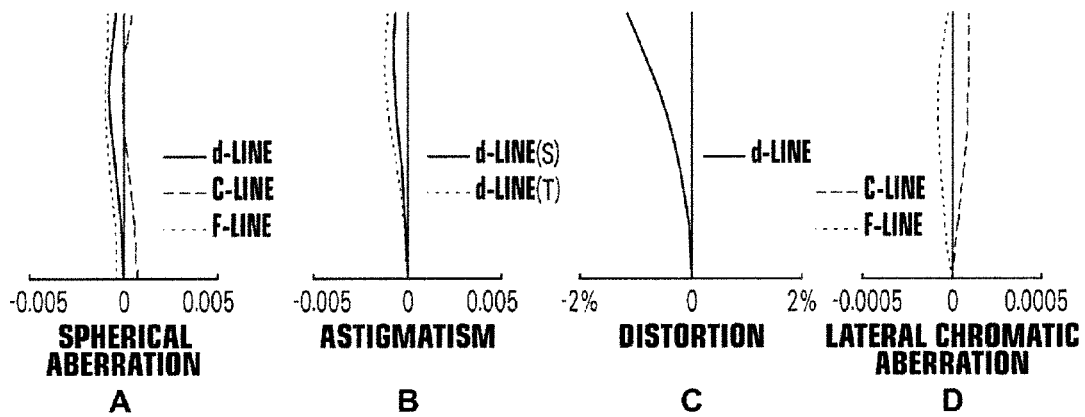
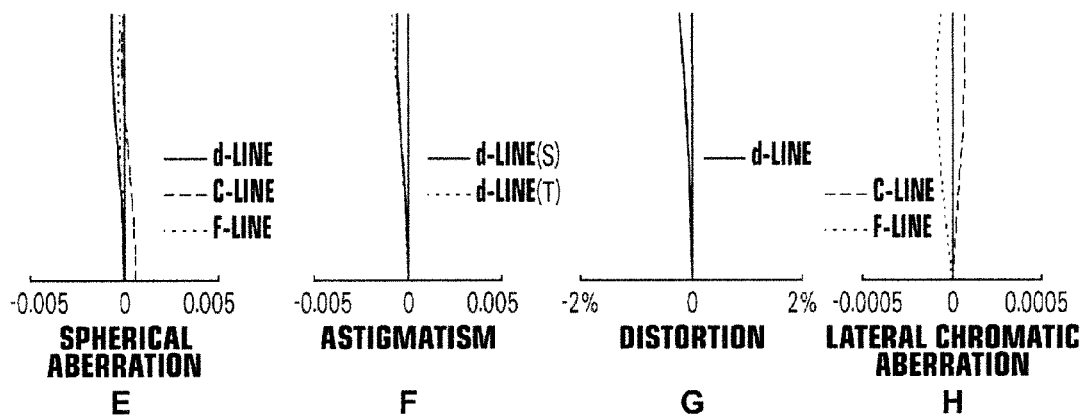
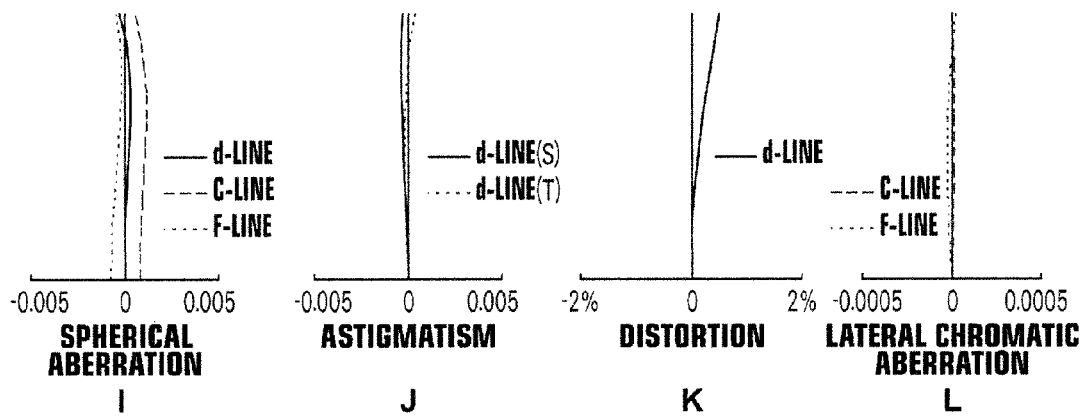

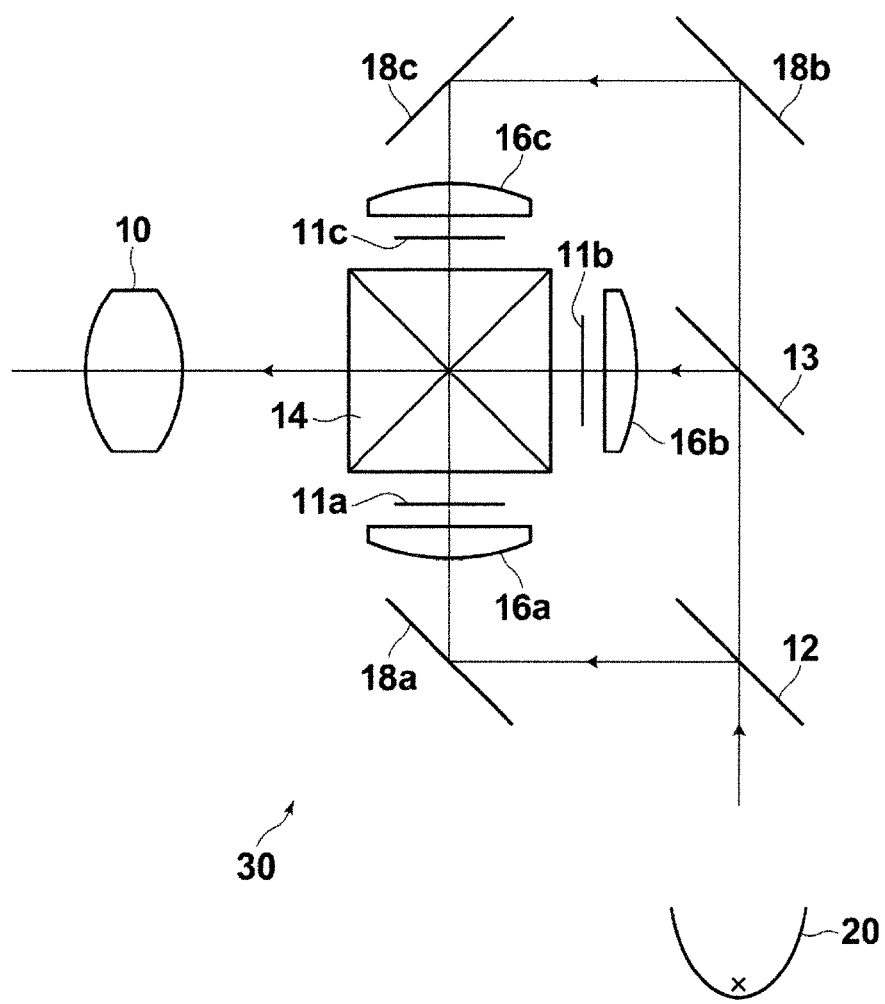

PROJECTION ZOOM LENS AND PROJECTION TYPE DISPLAY DEVICE

BACKGROUND OF THE INVENTION

The present invention relates to a projection zoom lens and a projection type display device, and for example, to a projection zoom lens suitable for enlarging and projecting a light flux that carries video information from a light valve onto a screen and a projection type display device including this lens.

DESCRIPTION OF THE RELATED ART

Conventionally, projection type projector devices (projection type display devices) that utilize a light valve, such as liquid crystal display elements, DMD's (Digital Micromirror Device: registered trademark), or the like, have been commonly available and the performance thereof has been improving. In particular, as a result of high definition of light valves, high resolution performance for projection lenses has been in demand.

Taking enhancement of degrees of freedom in setting the distance to a screen and installation properties in narrow interior spaces into consideration, there is great demand to mount zoom lenses, which are configured to be compact while having higher performance and high zoom ratios, on projection type display devices.

Projection zoom lenses composed of six lens groups in total, in which a negative lens group and a positive lens group are respectively disposed at the most-magnification side and at the most-reduction side, these lens groups are fixed while changing magnification, and four lens groups between these lens groups are moved while changing magnification, have been proposed (refer to Japanese Patent No. 4695744 and Japanese Unexamined Patent Publication No. 2009-210594, for example).

SUMMARY OF THE INVENTION

However, many of the projection zoom lenses disclosed in Japanese Patent No. 4695744 have low zoom ratio and are unable to sufficiently meet recent demands. Alternatively, some of the projection zoom lenses disclosed in Japanese Patent No. 4695744, which have relatively high zoom ratios, have room for improvement in that case that high performance is desired over the entire zoom range. Further, the projection zoom lenses disclosed in Japanese Unexamined Patent Publication No. 2009-210594 are required to have higher zoom ratios or to have smaller F-numbers in order to meet recent strict demands.

The present invention has been developed in view of such circumstances, it is an object of the present invention to provide a projection zoom lens, in which a reduction side is made telecentric, various aberrations are satisfactorily corrected over the entire zoom range, and which has high optical performance while achieving a compact size, a small F-number, and a high zoom ratio; and a projection type display device including such a projection zoom lens.

A projection zoom lens according to the present invention substantially consists of six lens groups in which a first lens group having negative refractive power, a second lens group having positive refractive power, a third lens group having negative refractive power, a fourth lens group having positive refractive power, a fifth lens group having negative refractive power, and a sixth lens group having positive refractive power are disposed in this order from a magnification side and in which a reduction side is made telecentric, wherein the second lens group, the third lens group, the fourth lens group, and the fifth lens group are moved while the first lens group and the sixth lens group are fixed while changing magnification, and wherein conditional expressions (1) and (2) below are satisfied:

$$1.5 < ft/fw \quad (1), \text{ and}$$

$$0.5 < f5/f3 < 10.0 \quad (2), \text{ where}$$

ft: the focal length of the entire system at the telephoto end
fw: the focal length of the entire system at the wide angle end
f5: the focal length of the fifth lens group, and
f3: the focal length of the third lens group.

It is preferable for the projection zoom lens according to the present invention to be configured to perform focus adjustment by moving the first lens group in the optical axis direction.

In the projection zoom lens according to the present invention, it is preferable for the first lens group to include at least two negative lenses with a concave surface facing a reduction side. Further, it is preferable for the first lens group to include at least one negative lens having the Abbe number of not lower than 50 with respect to a d-line.

In the projection zoom lens according to the present invention, it is preferable for a negative lens with a concave surface facing the reduction side to be disposed at the most magnification side of the fifth lens group. Further, it is preferable for a positive lens with a convex surface facing the reduction side to be disposed at the most reduction side of the fifth lens group. Further, it is preferable for the fifth lens group to include at least one positive lens having the Abbe number of not lower than 50 with respect to the d-line.

In the projection zoom lens according to the present invention, it is preferable for the sixth lens group to substantially consist of one positive lens with a convex surface facing the magnification side.

It is preferable for the projection zoom lens according to the present invention to satisfy conditional expression (2') below:

$$1.0 < f5/f3 < 8.0 \quad (2')$$

It is preferable for the projection zoom lens according to the present invention to satisfy conditional expression (3) below, more preferable to satisfy conditional expression (3') below, and even more preferable to satisfy conditional expression (3") below:

$$10.0 < vdp - vdn < 60.0 \quad (3)$$

$$12.0 < vdp - vdn < 50.0 \quad (3'), \text{ and}$$

$$14.0 < vdp - vdn < 40.0 \quad (3''), \text{ where}$$

vdp: the average value of the Abbe number with respect to the d-line of positive lenses included in the fifth lens group, and
vdn: the average value of the Abbe number with respect to the d-line of negative lenses included in the fifth lens group.

The projection type display device of the present invention includes a light source; a light valve which light from the light source enters; and the above projection zoom lens of the present invention as a projection zoom lens which projects optical images generated by light modulated by the light valve onto a screen.

Note that the above expression "magnification side" means a side to be projected (a screen side), and the screen side is referred to as the magnification side in the case of reduced projection as well, for the sake of convenience. The above expression "reduction side" means an original-image display region side (a light valve side), and the light valve side is referred to as the reduction side in the case of reduced projection as well, for the sake of convenience.

Note that the above expression "substantially consists of six lens groups" intends to mean that the projection zoom lens may include lenses substantially without any power; optical elements other than lenses such as apertures, glass covers, and filters; and in addition to the lens groups which are listed as constituent elements.

Note that the above expression "reduction side is made telecentric" refers to a state in which a line bisecting the angle formed by a ray having a maximum height in the upper side and a ray having a maximum height in the bottom side is nearly parallel to the optical axis in a cross section of a light flux which is focused on an arbitrary point on an image surface on the reduction side. The above expression is not limited to a case that the reduction side is made completely telecentric, that is, the line bisecting the angle is completely parallel to the optical axis, but also refers to cases in which a certain degree of error is present. Here, the certain degree of error refers to a range of inclination between the bisecting angular line and the optical path of ±3°.

Note that the "lens groups" are not necessarily constituted by a plurality of lenses, and include those that are constituted by a single lens.

A projection zoom lens according to the present invention is favorably configured such that negative refractive power, positive refractive power, negative refractive power, positive refractive power, negative refractive power, and positive refractive power are disposed in this order from a magnification side; while changing magnification, a first and a six lens groups are fixed and a second through a fifth lens groups are moved; a reduction side is made telecentric; and the ratio of the focal length of the entire system at a wide angle end to that at a telephoto end and the ratio of the focal lengths of two negative lenses among moving lens groups satisfy conditional expressions (1) and (2). This can satisfactorily correct various aberrations over the entire zoom range while achieving a compact size, a small F-number, and a high zoom ratio.

Further, a projection type display device according to the present invention includes the projection zoom lens of the present invention, thereby enabling a compact configuration and a high zoom ratio while achieving favorable projection performance over the entire zoom range.

BRIEF DESCRIPTION OF THE DRAWINGS

FIG. 8 is a collection of cross sectional views of a projection zoom lens according to Example 8 of the present invention, illustrating the lens configuration and light beam paths thereof.

FIG. 11 shows aberration diagrams A through L of the projection zoom lens according to Example 1 of the present invention.

FIG. 12 shows aberration diagrams A through L of the projection zoom lens according to Example 2 of the present invention.

FIG. 13 shows aberration diagrams A through L of the projection zoom lens according to Example 3 of the present invention.

FIG. 14 shows aberration diagrams A through L of the projection zoom lens according to Example 4 of the present invention FIG. 15 shows aberration diagrams A through L of the projection zoom lens according to Example 5 of the present invention FIG. 16 shows aberration diagrams A through L of the projection zoom lens according to Example 6 of the present invention FIG. 17 shows aberration diagrams A through L of the projection zoom lens according to Example 7 of the present invention FIG. 18 shows aberration diagrams A through L of the projection zoom lens according to Example 8 of the present invention FIG. 19 shows aberration diagrams A through L of the projection zoom lens according to Example 9 of the present invention FIG. 20 shows aberration diagrams A through L of the projection zoom lens according to Example 10 of the present invention FIG. 21 is a schematic configuration diagram of a projection type display device according to an embodiment of the present invention.

DESCRIPTION OF THE PREFERRED EMBODIMENTS

Hereinafter, embodiments of the present invention will be described in detail with reference to the accompanying drawings. Each of FIGS. 1 through 10 is a collection of cross sectional views of a projection zoom lens according to an embodiment of the present invention, illustrating an example of a configuration thereof, which corresponds to each of the zoom lenses for projection of Examples 1 through 10 to be described later. The basic configurations illustrated in FIGS. 1 through 10 are all the same, and the manners in which the configurations are illustrated are also the same. Therefore, the projection zoom lenses according to the embodiments of the present invention will be described mainly with reference to FIG. 1.

Figure 1:
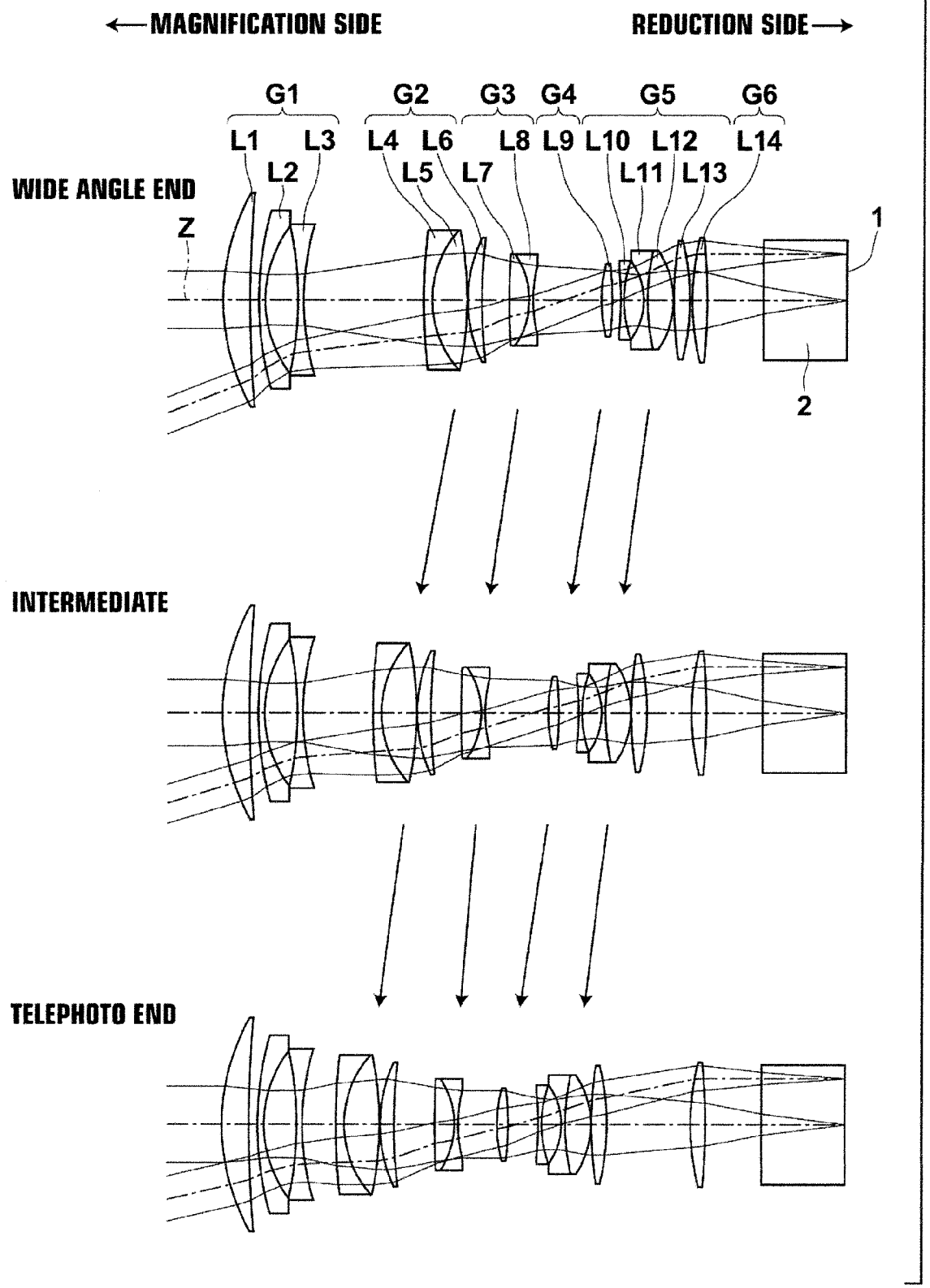
FIG. 1 is a collection of cross-sectional views of a projection zoom lens according to Example 1 of the present invention, illustrating the lens configuration and light beam paths thereof.

FIG. 1 is a collection of cross sectional views of a projection zoom lens according to one embodiment of the present invention, illustrating the lens configuration thereof and positions of each lens group in a wide angle end, an intermediate focal length state, and a telephoto end. Note that FIG. 1 also shows light beam paths on the axis and with respect to the outermost angle of view.

This projection zoom lens can be used as a projection lens, which is mounted, for example, on a projection type display device, and which projects image information displayed on a light valve onto a screen. In FIG. 1, the left side of the diagram is designated as a magnification side, and the right side thereof is designated as a reduction side. Further, supposing a case that the projection zoom lens is mounted on the projection type display devices, FIG. 1 also shows a glass block 2 and an image display surface 1 of the light valve disposed at a surface on the reduction side of the glass block 2, which is supposed to be a filter, a prism, and the like used for a color composition section or an illumination light separating section.

In the projection type display device, a light flux which has been provided with image information at the image display surface 1 enters this projection zoom lens via the glass block 2, and the projection zoom lens enlarges and projects the light flux onto a screen (not shown) disposed toward the left side direction of the drawing sheet.

Note that although FIG. 1 shows an example in which the position of a surface on the reduction side of the glass block 2 matches the position of the image display surface 1, the projection zoom lens of the present invention is not limited to such a configuration. Further, although FIG. 1 shows only one image display surface 1, the projection type display device may be configured to separate the light flux from the light source into the three primary colors by a color separation optical system, to be provided with three light valves which respectively correspond to the three primary colors, and to enable display of full color images.

The projection zoom lens according to the present embodiment is configured to substantially consist of six lens groups in which a first lens group G1 having negative refractive power, a second lens group G2 having positive refractive power, a third lens group G3 having negative refractive power, a fourth lens group G4 having positive refractive power, a fifth lens group G5 having negative refractive power, and a sixth lens group G6 having positive refractive power in this order from a magnification side; and a reduction side is made telecentric.

By disposing negative refractive power, positive refractive power, negative refractive power, positive refractive power, negative refractive power, and positive refractive power in this order from the magnification side in this manner, satisfactory correction of various aberrations over the zoom range is possible even in zoom lenses having a high zoom ratio of greater than 1.5×.

A configuration of a negative-lead type, in which a lens group on the most magnification side is designated as a negative lens group and a lens group on the most reduction side is designated as a positive lens group, enables an increase in the diameter of the lens most toward the magnification side, the diameter of which has a tendency to increase, to be suppressed compared to a positive lead type configuration. This is advantageous to miniaturization. Further, the configuration of a negative-lead type easily secures a back focus which is long enough for a prism or the like to be inserted.

If the second lens group G2 is a positive lens group, the lens diameter of the first lens group G1 can be small. Further, if the second lens group G2 is a positive lens group, the third lens group G3 is a negative lens group, the fourth lens group G4 is a positive lens group, and the fifth lens group G5 is a negative lens group, the lens configuration will have well-balanced power. This is advantageous to enabling satisfactory correction of variations of axial chromatic aberrations and curvature of field over the entire zoom range while preventing a movement amount of each lens group while changing magnification from excessively increasing and achieving miniaturization.

In the projection zoom lens of the present embodiments, the first lens group G1 and the sixth lens group G6 are fixed and the second lens group G2, the third lens group G3, the fourth lens group G4, and the fifth lens group G5 are moved while changing magnification. In FIG. 1, the directions of movement of the lens groups that move while changing magnification from the wide angle end to the intermediate focal length state and while changing magnification from the intermediate focal length state to the telephoto end are schematically indicated by the arrows between each position.

The projection zoom lens of the present embodiment is configured to have a zoom function by moving the four lens groups, the second lens group G2 through the fifth lens group G5, while changing magnification. By dividing the magnification changing function among the four lens groups, it becomes possible to simultaneously satisfy requirements with respect to miniaturization, high performance, high zoom ratio, and a small F number.

Note that it is preferable for the projection zoom lens of the present embodiment to be configured such that a focus adjustment is performed by moving the first lens group G1 in the optical axis direction when a projection distance is changed. For example, if only the first lens group G1 is moved in the optical axis direction in the case that the focus adjustment is performed, the mechanism will be simple and a reduction in size and cost will be achieved, compared to zoom lenses in which the other lens groups and the entire system are moved during focus adjustment.

Regarding the configuration of each of the lens groups, as illustrated in FIG. 1, the first lens group G1 substantially consists of three lenses, a first lens L1 through a third lens L3; the second lens group G2 substantially consists of three lenses, a fourth lens L4 through a sixth lens L6; the third lens group G3 substantially consists of two lenses, a seventh lens L7 through an eighth lens L8; the fourth lens group G4 substantially consists of one lens, a ninth lens L9; the fifth lens group G5 substantially consists of four lenses, a ten lens L10 through a thirteenth lens L13; and the sixth lens group G6 substantially consists of one lens, a fourteenth lens L14. Note that the number of lenses constituting each lens group is not necessarily limited to that of the example shown in FIG. 1.

It is preferable for the first lens group G1 to include at least two negative lenses with a concave surface facing the reduction side. In this case, the curvature of field and distortions can be satisfactorily corrected even at the wide angle end having a large angle of view.

It is preferable for the first lens group G1 to include at least one negative lens having an Abbe number of not lower than 50 with respect to the d-line. In this case, both axial chromatic aberrations and lateral chromatic aberrations can be favorably corrected with good balance over the entire zoom range.

It is preferable for the fifth lens group G5 to have a negative lens with a concave surface facing the reduction side, disposed at the most magnification side thereof. In this case, spherical aberrations and curvature of field can be satisfactorily corrected over the entire zoom range.

It is preferable for the fifth lens group G5 to have a positive lens with a convex surface facing the reduction side, disposed at the most reduction side thereof. In this case, curvature of field can be satisfactorily corrected over the entire zoom range.

It is preferable for the fifth lens group G5 to include at least one positive lens having an Abbe number of not lower than 50 with respect to the d-line. In this case, both axial chromatic aberrations and lateral chromatic aberrations can be favorably corrected with good balance over the entire zoom range.

It is preferable for the sixth lens group G6 to substantially consist of one positive lens with a convex surface facing the magnification side. In this case, curvature of field can be favorably corrected while maintaining telecentricity over the entire zoom range.

The projection zoom lens of the present embodiment is configured to satisfy conditional expressions (1) and (2) below:

$$1.5 < ft/fw \quad (1), \text{ and}$$

$$0.5 < f5/f3 < 10.0 \quad (2), \text{ where}$$

ft: the focal length of the entire system at the telephoto end
fw: the focal length of the entire system at the wide angle end
f5: the focal length of the fifth lens group, and
f3: the focal length of the third lens group.

Conditional expression (1) relates to the zoom ratio. If the value of ft/fw is lower than the lower limit defined by conditional expression (1), a high zoom ratio cannot be obtained, which causes an available range to be narrowed and degrades versatility.

Conditional expression (2) relates to the ratio of refractive power of two lens groups having negative refractive power among the lens groups which move while changing magnification. If the value of f5/f3 is lower than the lower limit defined by conditional expression (2), most of the negative refractive power within the lens groups which moves while changing magnification will be concentrated in the fifth lens group G5, which makes it difficult to satisfactorily correct various aberrations over the entire zoom range. If the value of f5/f3 exceeds the upper limit defined by conditional expression (2), most of the negative refractive power within the lens groups which move while changing magnification will be concentrated in the third lens group G3, which makes it difficult to satisfactorily correct various aberrations over the entire zoom range.

Taking the above circumstances into consideration, it is preferable for the projection zoom lens to satisfy conditional expression (2') below in order to satisfactorily correct various aberrations over the entire zoom range:

$$1.0 < f5/f3 < 8.0 \quad (2')$$

It is preferable for the projection zoom lens according to the present embodiment to satisfy conditional expression (3) below:

$$10.0 < vdp - vdn < 60.0 \quad (3), \text{ where}$$

vdp: the average value of the Abbe number with respect to the d-line of positive lenses included in the fifth lens group, and
vdn: the average value of the Abbe number with respect to the d-line of negative lenses included in the fifth lens group.

Conditional expression (3) relates to dispersion characteristics of positive and negative lenses which constitute the fifth lens group G5. If the value of vdp−vdn is lower than the lower limit defined by conditional expression (3), it will be difficult to correct both axial chromatic aberrations and lateral chromatic aberrations favorably with good balance over the entire zoom range. If the value of vdp−vdn exceeds the upper limit defined by conditional expression (3), the amount of correction for chromatic aberration will increase excessively, thereby making it difficult to correct both axial chromatic aberrations and lateral chromatic aberrations favorably with good balance.

Taking the above circumstances into consideration, it is preferable for the projection zoom lens to satisfy conditional expression (3') below, and more preferable to satisfy conditional expression (3") below in order to correct both axial chromatic aberrations and lateral chromatic aberrations favorably with good balance over the entire zoom range:

$$12.0 < vdp - vdn < 50.0 \quad (3'), \text{ and}$$

$$14.0 < vdp - vdn < 40.0 \quad (3").$$

Note that in the projection zoom lens which is to be achieved by the present invention, it is preferable for distortion to be suppressed to approximately 2% or less across the entire range of magnification.

Next, the projection type display device according to the present invention will be described with reference to FIG. 21. FIG. 21 is a schematic configuration diagram of a part of a projection type display device according to an embodiment of the present invention.

The projection type display device 100 illustrated in FIG. 21 includes a projection zoom lens 10 according to an embodiment of the present invention; a light source 20; transmissive display elements 11a through 11c as light valves which respectively correspond to colors of light; and an illumination optical section 30 which guides the light flux emitted from the light source 20 to the light valves. The illumination optical section 30 includes dichroic mirrors 12 and 13 for color separation; condenser lenses 16a through 16c; a cross dichroic prism 14 for color composition; condenser lenses 16a through 16c; and total reflection mirrors 18a through 18c. Note that FIG. 21 schematically shows the projection zoom lens. Further, an integrator such as a fly-eye lens is arranged between the light source 20 and the dichroic mirror 12, although not shown in FIG. 21.

White light emitted from the light source 20 is separated into three colored light beams (G light, B light, and R light) by the dichroic mirrors 12 and 13 of the illumination optical section 30, and then optical paths thereof are respectively deflected by the total reflection mirrors 18a through 18c. Then, the beams pass through the condenser lenses 16a through 16c, and enter the transmissive display elements 11a through 11c respectively corresponding to the colored light beams and are optically modulated. The optically modulated beams are composed by the cross dichroic prism 14, and then enters the projection zoom lens 10. The projection zoom lens 10 projects an optical image formed by the light modulated by the transmissive display elements 11a through 11c onto a screen (not shown).

For example, transmissive liquid crystal display elements and the like can be used as the transmissive display elements 11a through 11c. Note that FIG. 21 shows an example in which transmissive display elements are used as the light valves. The light valves included in the projection type display device of the present invention are not limited to these elements, and other optical modulation means such as reflection type liquid crystal display elements, DMD's, or the like can be applied.

Next, specific Examples of the projection zoom lens of the present invention will be described.

EXAMPLE 1

The lens configuration of the projection zoom lens of Example 1 is shown in FIG. 1. Since FIG. 1 was described above, redundant descriptions thereof will be omitted. The configurations of FIG. 1 relate to a case that the projection distance is infinity.

The projection zoom lens of Example 1 is configured to substantially consist of six groups in which a first lens group G1 having negative refractive power; a second lens group G2 having positive refractive power; a third lens group having negative refractive power; a fourth lens group G4 having positive refractive power; a fifth lens group G5 having negative refractive power; and a sixth lens group G6 having positive refractive power are disposed in this order from the magnification side and in which the reduction side is made telecentric. A glass block 2 supposed to be various kinds of filters, such as an infrared ray cut-off filter, a low pass filter, and the like; a color composition prism; or the like is disposed on the reduction side of the sixth lens group G6. Further, an image display surface 1 of the light valve is disposed so as to be in contact with the reduction side surface of the glass block 2 at the reduction side of the sixth lens group G6.

The first lens group G1 and the sixth lens group G6 are fixed, and the second lens group G2, the third lens group G3, the fourth lens group G4, and the fifth lens group G5 can be moved while changing magnification. Modes of movement thereof are schematically shown with arrows in FIG. 1. The focus adjustment in the case that the projection distance is changed is configured to be performed by moving the first lens group G1 in the optical axis direction.

The first lens group G1 substantially consists of a first lens L1 which is a positive meniscus lens with a concave surface facing the reduction side, a second lens L2 which is a negative meniscus lens with a concave surface facing the reduction side, a third lens L3 which is a biconcave lens in this order from the magnification side.

The second lens group G2 substantially consists of a fourth lens L4 which is a negative meniscus lens with a concave surface facing the reduction side, a fifth lens L5 which is a biconvex lens, and a sixth lens L6 which is a positive meniscus lens with a concave surface facing the reduction side in this order from the magnification side. The fourth lens L4 and the fifth lens L5 are cemented with each other.

The third lens group G3 substantially consists of a seventh lens L7 which is a biconvex lens; and an eighth lens L8 which is a biconcave lens in this order from the magnification side. The seventh lens L7 and the eighth lens L8 are cemented to each other. The fourth lens group G4 substantially consists of a ninth lens L9 which is a biconvex lens.

The fifth lens group G5 substantially consists of a tenth lens L10 which is a biconcave lens; an eleventh lens L11 which is a biconcave lens; a twelfth lens L12 which is a biconvex lens; and a thirteenth lens L13 which is a biconvex lens in this order from the magnification side. The eleventh lens L11 and the twelfth lens L12 are cemented to each other. The sixth lens group G6 substantially consists of a fourth lens L14 which is a biconvex lens.

A of Table 1 shows basic lens data of the projection zoom lens of Example 1. Item Si with respect to the basic lens data represents the i-th (i=1, 2, 3, . . . ) surface number, the value of i sequentially increasing from the surface of the constituent element at the most-magnification side, which is designated as 1, toward the reduction side. Item Ri represents the radius of curvature of the i-th surface (i=1, 2, 3, . . . ), and item Di represents the distances between i-th surfaces and (i+1)st surfaces along the optical axis Z1. Further, item Ndj represents the refractive index of a j-th (j=1, 2, 3, . . . ) optical element with respect to the d-line (wavelength: 587.6 nm), the value of j sequentially increasing from the optical element at the most magnification side, which is designated as 1, toward the reduction side. Item νdj represents the Abbe number of the j-th optical element with respect to the d-line.

It should be noted that the sign of the radius of curvature is positive in the case that a surface shape is convex on the magnification side, and negative in the case that the surface shape is convex on the reduction side. The basic lens data shows the glass block 2 as well. The distance between the first lens group G1 and the second lens group G2, the distance between the second lens group G2 and the third lens group G3, the distance between the third lens group G3 and the fourth lens group G4, the distance between the fourth lens group G4 and the fifth lens group G5, and the distance between the fifth lens group G5 and the sixth lens group G6 change while changing magnification while changing magnification. DD[6], DD[11], DD[14], DD[16], and DD[23] are respectively shown in the columns of the distances between surfaces corresponding to these distances.

Data regarding specs with respect to the d-line of the projection zoom lens of Example 1 in B of Table 1 shows values of a zoom magnification rate (zoom ratio), the focal length f' of the entire system, the back focus Bf (air conversion distance), F-number Fno., and a total angle of view 2ω in each of the wide angle end, the intermediate focal length state, and the telephoto end.

Data regarding the distance associated with zooming of the projection zoom lens of Example 1 in C of Table 1 shows values of the distance between surfaces in each of DD[6], DD[11], DD[14], DD[16], and DD[23] as described above at each of the wide angle end, the intermediate focal length state, and the telephoto end.

Note that the numerical values shown in Table 1 are standardized such that the focal length of the entire system at the wide angle end becomes 1 in the case that the projection distance is infinity. Further, the numerical values of each Table are rounded to a predetermined number of digits.

TABLE 1

| A Example 1·Lens Data | | | | |
|---|---|---|---|---|
| Si | Ri | Di | Ndj | ν dj |
| 1 | 1.6369 | 0.2297 | 1.78472 | 25.68 |
| 2 | 9.3362 | 0.0741 | | |
| 3 | 2.4910 | 0.0532 | 1.71299 | 53.87 |
| 4 | 0.9064 | 0.2772 | | |
| 5 | −2.6007 | 0.0473 | 1.72342 | 37.95 |
| 6 | 1.9818 | DD[6] | | |
| 7 | 4.7323 | 0.0711 | 1.76182 | 26.52 |
| 8 | 0.7858 | 0.2968 | 1.72916 | 54.68 |
| 9 | −2.5244 | 0.0047 | | |
| 10 | 1.0803 | 0.1185 | 1.83400 | 37.16 |
| 11 | 3.9981 | DD[11] | | |
| 12 | 7.6369 | 0.1677 | 1.75520 | 27.51 |
| 13 | −0.6036 | 0.0331 | 1.74950 | 35.33 |
| 14 | 1.0257 | DD[14] | | |
| 15 | 1.1516 | 0.0900 | 1.58913 | 61.14 |
| 16 | −2.3091 | DD[16] | | |
| 17 | −2.2055 | 0.0284 | 1.51633 | 64.14 |
| 18 | 0.8790 | 0.1674 | | |

TABLE 1-continued

| | | | | |
|---|---|---|---|---|
| 19 | −0.4928 | 0.0333 | 1.62004 | 36.26 |
| 20 | 1.7523 | 0.2153 | 1.49700 | 81.54 |
| 21 | −0.6534 | 0.0051 | | |
| 22 | 3.0336 | 0.1316 | 1.67790 | 55.34 |
| 23 | −1.8523 | DD[23] | | |
| 24 | 1.9033 | 0.1266 | 1.71299 | 53.87 |
| 25 | −4.8370 | 0.4739 | | |
| 26 | ∞ | 0.7102 | 1.51680 | 64.20 |
| 27 | ∞ | | | |

B Example 1•Specs (d-line)

| | Wide Angle End | Middle | Telephoto End |
|---|---|---|---|
| Zoom Ratio | 1.000 | 1.304 | 1.700 |
| f | 1.000 | 1.304 | 1.700 |
| Bf | 0.942 | 0.942 | 0.942 |
| FNo. | 2.21 | 2.49 | 2.83 |
| 2ω[°] | 40.5 | 31.6 | 24.4 |

C Example 1•Distance Associated With Zooming

| | Wide Angle End | Middle | Telephoto End |
|---|---|---|---|
| DD[6] | 1.0148 | 0.5881 | 0.2808 |
| DD[11] | 0.2295 | 0.2577 | 0.3475 |
| DD[14] | 0.5801 | 0.5312 | 0.3280 |
| DD[16] | 0.0719 | 0.1674 | 0.2569 |
| DD[23] | 0.0210 | 0.3729 | 0.7041 |

All of the lens surfaces of the projection zoom lens of Example 1 are spherical surfaces, and no lenses having aspherical surfaces are employed. Therefore, the projection zoom lens of Example 1 is advantageous from the viewpoint of cost.

A through D of FIG. 11 respectively show aberration diagrams of spherical aberration, astigmatism, distortion, and lateral chromatic aberration of the projection zoom lens of Example 1 at the wide angle end. E through H of FIG. 11 respectively show aberration diagrams of spherical aberration, astigmatism, distortion, and lateral chromatic aberration of the projection zoom lens of Example 1 in the intermediate focal length state. I through L of FIG. 11 respectively show aberration diagrams of spherical aberration, astigmatism, distortion, and lateral chromatic aberration (chromatic aberration of magnification) of the projection zoom lens of Example 1 at the telephoto end.

The aberration diagrams of A through L of FIG. 11 apply the d-line as a reference, the spherical aberration diagram shows aberrations with respect to the F-line (wavelength: 486.1 nm) and the C-line (wavelength: 656.3 nm) as well, and the lateral chromatic aberration diagram also shows aberrations with respect to the F-line and the C-line. Further, the astigmatism diagram shows aberration in a sagittal direction with a solid line indicated by the symbol "S" and aberration in a tangential direction with a dotted line indicated by the symbol "T". The sign "Fno.", which is indicated above the vertical axis in the spherical aberration diagram, refers to a F-number, and the sign "ω", which is indicated above the vertical axis in the other aberration diagrams, refers to a half angle of view. Note that the aberration diagrams in A through L of FIG. 11 are those in the case that the reduction magnification is −0.008×.

Note that values of the projection zoom lens of Example 1 related to values corresponding to conditional expressions (1) through (3) are shown together with those of the other Examples 2 through 10 in Table 11.

The points regarding the symbols that represent each item of data, the meanings thereof, the manners in which they are shown, that the numerical values are normalized such that the focal distance of the entire system at the wide angle end is 1, that the numerical values of the lens data are for when the projection distance is infinitely far, and that the diagrams that illustrate aberrations are those for when the reduction ratio is −0.008× apply to Examples 2 through 10 to be described below, unless otherwise noted.

EXAMPLE 2

Figure 2:
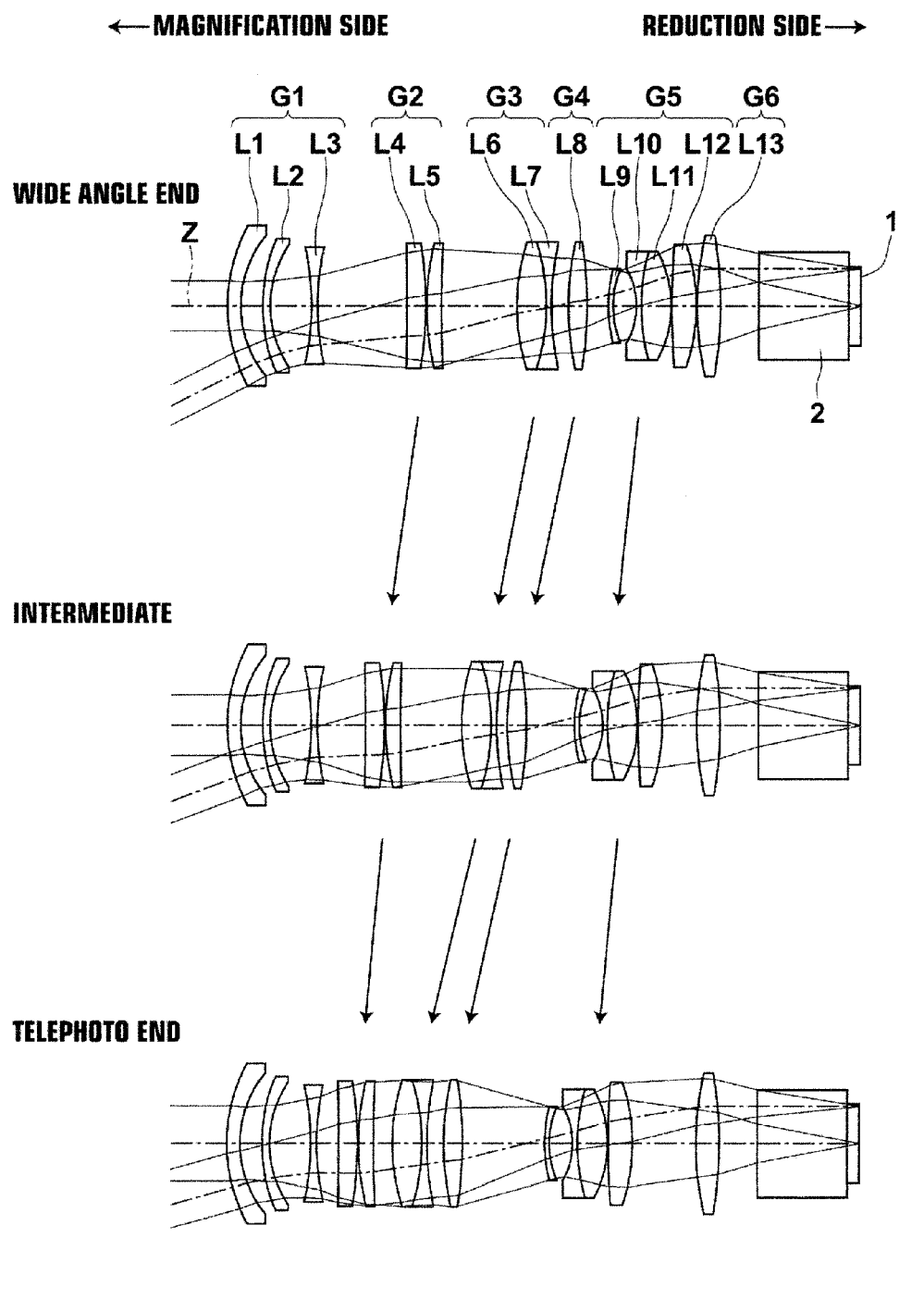
FIG. 2 is a collection of cross sectional views of a projection zoom lens according to Example 2 of the present invention, illustrating the lens configuration and light beam paths thereof.

FIG. 2 shows the lens configuration and light beam paths of the projection zoom lens according to Example 2 in each of the wide angle end, the intermediate focal length state, and the telephoto end. Regarding the six-lens-group configuration of the projection zoom lens of Example 2, the signs of the refractive powers of each of a first lens group G1 through a sixth lens group G6, the lens groups that remain fixed while changing magnification, the lens groups that move while changing magnification, and the lens group which is employed to adjust focus are the same as those of the projection zoom lens of Example 1. However, the lens configuration of each of the lens groups differs from that of Example 1 as described below.

The first lens group G1 substantially consists of a first lens L1 which is a negative meniscus lens with a concave surface facing the reduction side; a second lens L2 which is a negative meniscus lens with a concave surface facing the reduction side; and a third lens L3 which is a biconcave lens in this order from the magnification side.

The second lens group G2 substantially consists of a fourth lens L4 which is a positive meniscus lens with a convex surface facing the reduction side; and a fifth lens L5 which is a positive meniscus lens with a concave surface facing the reduction side in this order from the magnification side.

The third lens group G3 substantially consists of a sixth lens L6 which is a biconvex lens, and a seventh lens L7 which is a biconcave lens in this order from the magnification side. The sixth lens L6 and the seventh lens L7 are cemented to each other. The fourth lens group G4 substantially consists of an eighth lens L8 which is a biconvex lens.

The fifth lens group G5 substantially consists of a ninth lens L9 which is a negative meniscus lens with a concave surface facing the reduction side; a tenth lens L10 which is a biconcave lens; an eleventh lens L11 which is a biconvex lens; and a twelfth lens L12 which is a biconvex lens in this order from the magnification side. The tenth lens L10 and the eleventh lens L11 are cemented to each other. The sixth lens group G6 substantially consists of a thirteenth lens L13 which is a biconvex lens.

A through C of Table 2 respectively show basic lens data, specs with respect to the d-line, and the distance associated with zooming of the projection zoom lens of Example 2. A of Table 2 indicates "DD[6]", "DD[10]", "DD[13]", "DD[15]", and "DD[22]" in each of the spaces of the distance between surfaces which changes while changing magnification, and C of Table 2 indicates the respective values thereof.

Note that in the projection zoom lens of Example 2, both surfaces (a third surface and a fourth surface) of the second lens L2 are aspheric surfaces, and in A of Table 2, the mark "*" is indicated at surface numbers of these aspheric surfaces. Numerical values of paraxial radii of curvature are indicated as the radii of curvature of the aspheric surfaces. D of Table 2 shows surface numbers of these aspheric surfaces and respective aspheric surface coefficients of aspheric surfaces. The expression "E-n" (n: integral numbers) in the numerical values of the aspheric surface coefficients of D of Table 2 refers to "×10⁻ᵐ". The aspheric surface coefficients of D of Table 2 shows values of respective coefficients KA, Am (m=4, 6, 8, and 10).

$$Zd = C \cdot h^2 / \{1 + (1 - KA \cdot C^2 \cdot h^2)^{1/2}\} + A4 \cdot h^4 + A6 \cdot h^6 + A8 \cdot h^8 + A10 \cdot h^{10}$$

where,

Zd: the depth of an aspheric surface (the length of a perpendicular line drawn from a point on an aspheric surface with a height h to a plane perpendicular to the optical axis which contacts the peak of the aspheric surface)

h: height (the distance from the optical axis to a lens surface)

C: a paraxial radius of curvature

KA, Am (m=4, 6, 8, 10): aspheric surface coefficients

TABLE 2

| A Example 2•Lens Data | | | | |
|---|---|---|---|---|
| Si | Ri | Di | Ndj | νdj |
| 1 | 2.0221 | 0.1763 | 1.71299 | 53.87 |
| 2 | 1.3133 | 0.2991 | | |
| *3 | 2.2259 | 0.1011 | 1.53039 | 55.25 |
| *4 | 1.3030 | 0.5548 | | |
| 5 | −3.0992 | 0.0788 | 1.48749 | 70.23 |
| 6 | 3.0992 | DD[6] | | |
| 7 | −31.1628 | 0.2523 | 1.83400 | 37.16 |
| 8 | −4.4861 | 0.0151 | | |
| 9 | 3.0715 | 0.2030 | 1.83400 | 37.16 |
| 10 | 24.0709 | DD[10] | | |
| 11 | 2.4830 | 0.3946 | 1.51633 | 64.14 |
| 12 | −2.4830 | 0.0709 | 1.68893 | 31.07 |
| 13 | 3.5058 | DD[13] | | |
| 14 | 3.3997 | 0.2526 | 1.83400 | 37.16 |
| 15 | −4.5295 | DD[15] | | |
| 16 | 1.7595 | 0.0633 | 1.84666 | 23.78 |
| 17 | 1.1299 | 0.3127 | | |
| 18 | −0.8721 | 0.0662 | 1.84666 | 23.78 |
| 19 | 2.3465 | 0.4042 | 1.62041 | 60.29 |
| 20 | −1.3349 | 0.0101 | | |
| 21 | 10.0107 | 0.3257 | 1.80518 | 25.42 |
| 22 | −2.2438 | DD[22] | | |
| 23 | 3.7228 | 0.3154 | 1.67790 | 55.34 |
| 24 | −4.7154 | 0.5131 | | |
| 25 | ∞ | 1.2126 | 1.51633 | 64.14 |
| 26 | ∞ | 0.0000 | | |
| 27 | ∞ | 0.1617 | 1.45858 | 67.60 |
| 28 | ∞ | | | |

| B Example 2•Specs (d-line) | | | |
|---|---|---|---|
| | Wide Angle End | Intermediate | Telephoto End |
| Zoom Ratio | 1.000 | 1.342 | 1.800 |
| f | 1.000 | 1.342 | 1.800 |
| Bf | 1.424 | 1.424 | 1.424 |
| FNo. | 1.61 | 1.76 | 1.89 |
| 2ω[°] | 51.1 | 38.9 | 29.3 |

| C Example 2•Distance Associated With Zooming | | | |
|---|---|---|---|
| | Wide Angle End | Intermediate | Telephoto End |
| DD[6] | 1.2005 | 0.6492 | 0.2945 |
| DD[10] | 1.0076 | 0.8260 | 0.2547 |
| DD[13] | 0.2256 | 0.1457 | 0.2263 |
| DD[15] | 0.2869 | 0.6479 | 1.1025 |
| DD[22] | 0.0102 | 0.4621 | 0.8529 |

| D Example 2•Aspheric Surface Coefficience | | |
|---|---|---|
| Surface Number | 3 | 4 |
| KA | 2.85967E+00 | 1.01161E+00 |
| A4 | 1.47046E−03 | −1.23694E−02 |
| A6 | 1.52715E−02 | 1.52645E−02 |
| A8 | −5.65390E−04 | 6.00972E−03 |
| A10 | 3.76739E−04 | −1.92719E−04 |

A through L of FIG. 12 respectively show aberration diagrams of the projection zoom lens of Example 2.

EXAMPLE 3

Figure 3:
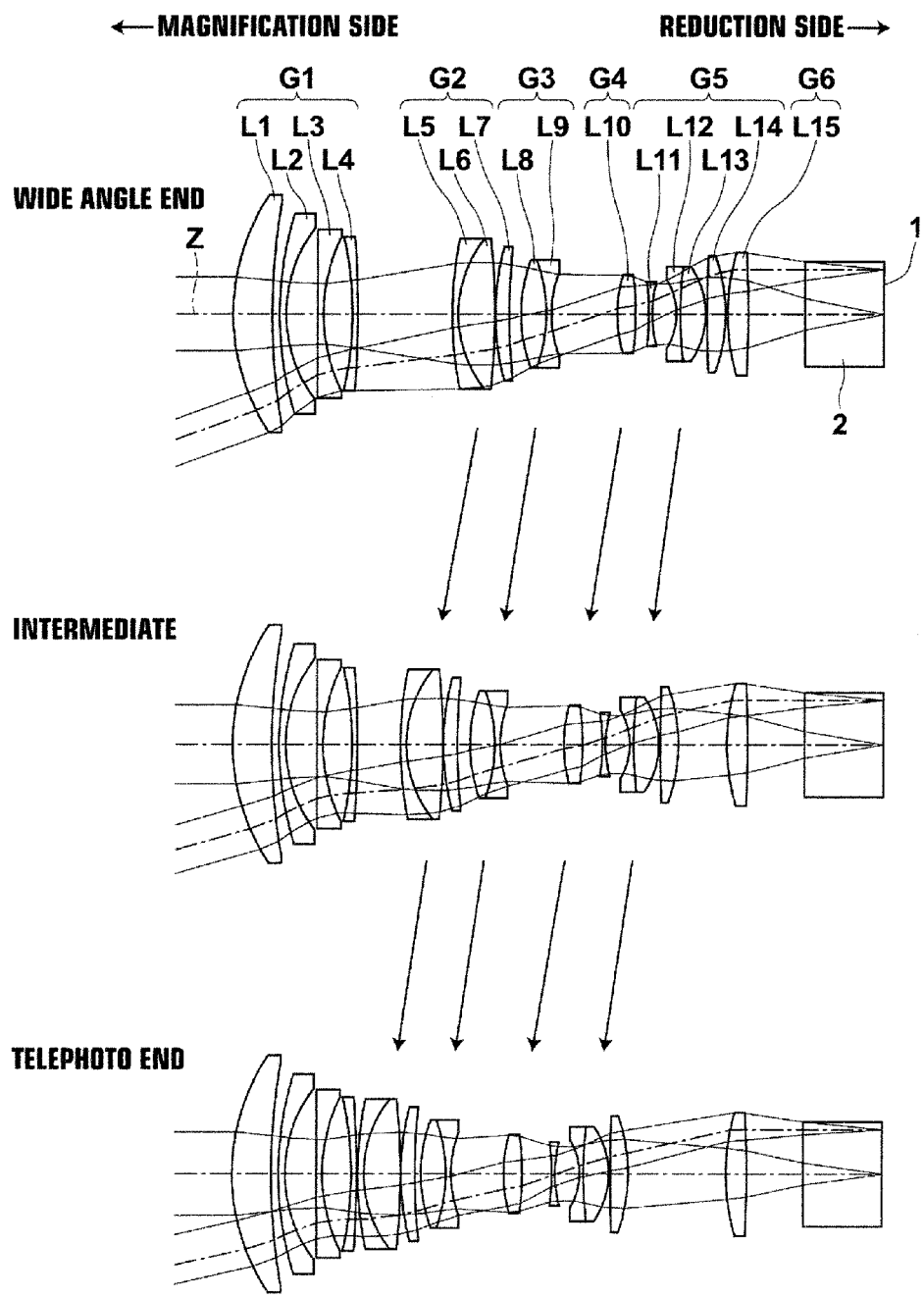
FIG. 3 is a collection of cross sectional views of a projection zoom lens according to Example 3 of the present invention, illustrating the lens configuration and light beam paths thereof.

FIG. 3 shows the lens configuration and light beam paths of the projection zoom lens according to Example 3 in each of the wide angle end, the intermediate focal length state, and the telephoto end. Regarding the six-lens-group configuration of the projection zoom lens of Example 3, the signs of the refractive powers of each of a first lens group G1 through a sixth lens group G6, the lens groups that remain fixed while changing magnification, the lens groups that move while changing magnification, and the lens group which is employed to adjust focus are the same as those of the projection zoom lens of Example 1. However, the lens configuration of each of the lens groups differs from that of Example 1 as described below.

The first lens group G1 substantially consists of a first lens L1 which is a positive meniscus lens with a concave surface facing the reduction side; a second lens L2 which is a negative meniscus lens with a concave surface facing the reduction side; a third lens L3 which is a planoconcave lens with a plane surface facing the magnification side; and a fourth lens L4 which is a negative meniscus lens with a convex surface facing the reduction side in this order from the magnification side.

The second lens group G2 substantially consists of a fifth lens L5 which is a negative meniscus lens with a concave surface facing the reduction side; a sixth lens L6 which is a biconvex lens; and a seventh lens L7 which is a positive meniscus lens with a concave surface facing the reduction side, in this order from the magnification side. The fifth lens L5 and the sixth lens L6 are cemented to each other.

The third lens group G3 substantially consists of an eighth lens L8 which is a biconvex lens; and a ninth lens L9 which is a biconcave lens, in this order from the magnification side. The eighth lens L8 and the ninth lens L9 are cemented to each other. The fourth lens group G4 substantially consists of a tenth lens L10 which is a biconvex lens.

The fifth lens group G5 substantially consists of an eleventh lens L11 which is a biconcave lens; a twelfth lens L12 which is a biconcave lens; a thirteenth lens L13 which is a biconvex lens; and a fourteenth lens L14 which is a biconvex lens, in this order from the magnification side. The twelfth lens L12 and the thirteenth lens L13 are cemented to each other. The sixth lens group G6 substantially consists of a fifteenth lens L15 which is a biconvex lens.

A through C of Table 3 respectively show basic lens data, specs with respect to the d-line, and the distance associated with zooming of the projection zoom lens of Example 3. A of Table 3 indicates "DD[8]", "DD[13]", "DD[16]", "DD[18]", and "DD[25]" in each of the spaces of the distance between surfaces which changes while changing magnification, and C of Table 3 indicates the respective values thereof. A through L of FIG. 13 respectively shows aberration diagrams of the projection zoom lens of Example 3.

TABLE 3

| A Example 3•Lens Data | | | | |
|---|---|---|---|---|
| Si | Ri | Di | Ndj | νdj |
| 1 | 1.5289 | 0.3151 | 1.83400 | 37.16 |
| 2 | 4.6506 | 0.0594 | | |
| 3 | 2.3872 | 0.0537 | 1.49700 | 81.54 |

TABLE 3-continued

| | | | | |
|---|---|---|---|---|
| 4 | 1.0033 | 0.2526 | | |
| 5 | ∞ | 0.0473 | 1.83400 | 37.16 |
| 6 | 1.2434 | 0.2312 | | |
| 7 | −2.4277 | 0.0430 | 1.49700 | 81.54 |
| 8 | −7.1943 | DD[8] | | |
| 9 | 2.6814 | 0.0485 | 1.48749 | 70.23 |
| 10 | 0.8589 | 0.2956 | 1.67003 | 47.23 |
| 11 | −4.9418 | 0.0043 | | |
| 12 | 1.8387 | 0.1115 | 1.80518 | 25.42 |
| 13 | 4.5991 | DD[13] | | |
| 14 | 1.1140 | 0.2009 | 1.58913 | 61.14 |
| 15 | −1.0940 | 0.0430 | 1.76182 | 26.52 |
| 16 | 0.8380 | DD[18] | | |
| 17 | 1.0437 | 0.1481 | 1.80518 | 25.42 |
| 18 | −2.3226 | DD[18] | | |
| 19 | −1.7418 | 0.0269 | 1.72825 | 28.46 |
| 20 | 0.8896 | 0.1947 | | |
| 21 | −0.4687 | 0.0324 | 1.64769 | 33.79 |
| 22 | 2.7782 | 0.2044 | 1.49700 | 81.54 |
| 23 | −0.5879 | 0.0134 | | |
| 24 | 15.6854 | 0.1431 | 1.71299 | 53.87 |
| 25 | −1.2158 | DD[25] | | |
| 26 | 1.5506 | 0.1678 | 1.77250 | 49.60 |
| 27 | −7.7897 | 0.4540 | | |
| 28 | ∞ | 0.6424 | 1.51633 | 64.14 |
| 29 | ∞ | | | |

B Example 3·Specs (d-line)

| | Wide Angle End | Intermediate | Telephoto End |
|---|---|---|---|
| Zoom Ratio | 1.000 | 1.265 | 1.600 |
| f' | 1.000 | 1.265 | 1.600 |
| Bf | 0.878 | 0.878 | 0.878 |
| FNo. | 1.80 | 2.12 | 2.54 |
| 2ω[°] | 37.5 | 29.9 | 23.8 |

C Example 3·Distance Associated With Zooming

| | Wide Angle End | Intermediate | Telephoto End |
|---|---|---|---|
| DD[8] | 0.7623 | 0.3478 | 0.0104 |
| DD[13] | 0.0934 | 0.1021 | 0.0496 |
| DD[16] | 0.5287 | 0.5112 | 0.4244 |
| DD[18] | 0.1085 | 0.1605 | 0.2390 |
| DD[25] | 0.0175 | 0.3889 | 0.7870 |

EXAMPLE 4

Figure 4:
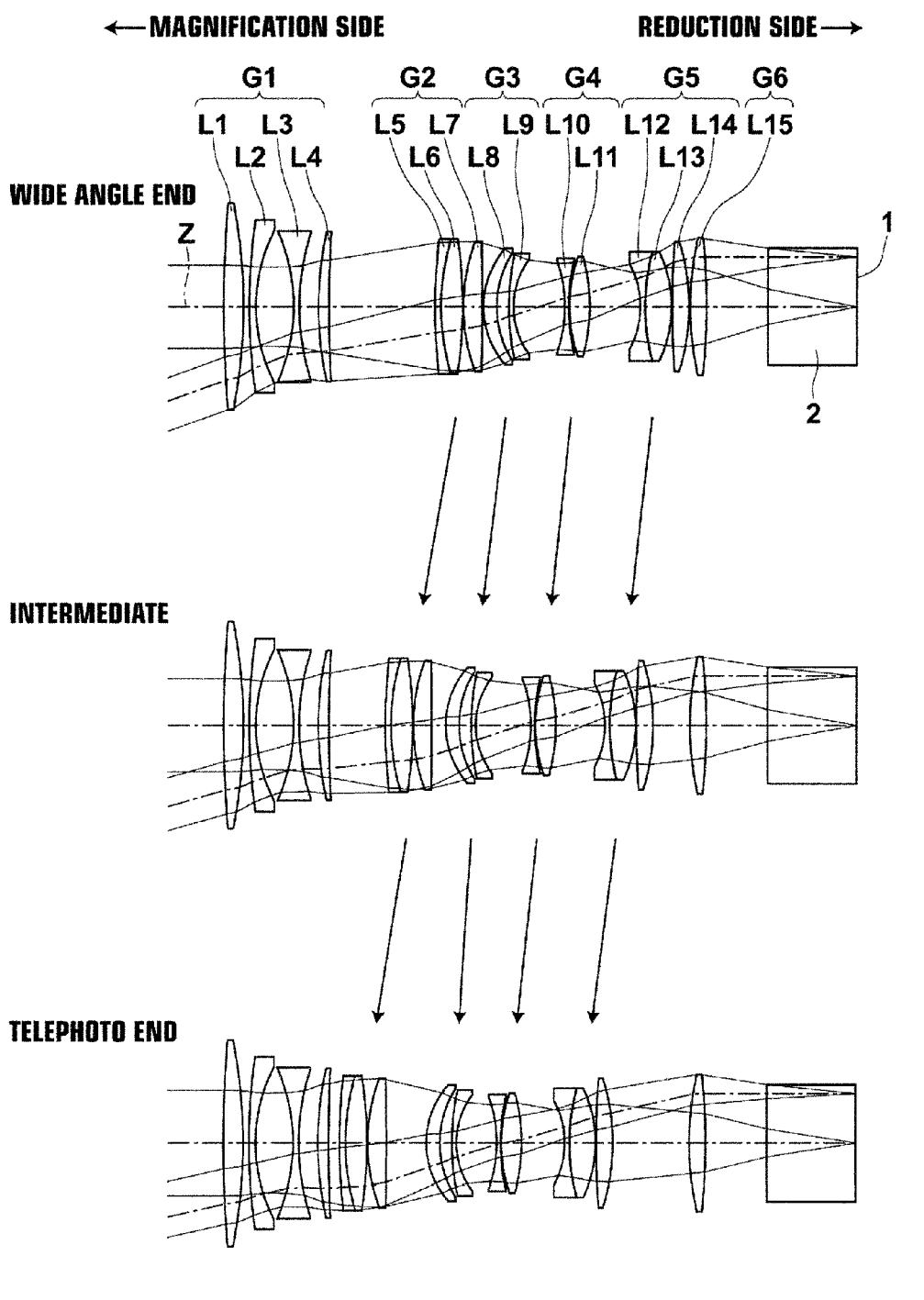
FIG. 4 is a collection of cross sectional views of a projection zoom lens according to Example 4 of the present invention, illustrating the lens configuration and light beam paths thereof.

FIG. 4 shows the lens configuration and light beam paths of the projection zoom lens according to Example 4 in each of the wide angle end, the intermediate focal length state, and the telephoto end. Regarding the six-lens-group configuration of the projection zoom lens of Example 4, the signs of the refractive powers of each of a first lens group G1 through a sixth lens group G6, the lens groups that remain fixed while changing magnification, the lens groups that move while changing magnification, and the lens group which is employed to adjust focus are the same as those of the projection zoom lens of Example 1. However, the lens configuration of each of the lens groups differs from that of Example 1 as described below.

The first lens group G1 substantially consists of a first lens L1 which is a biconvex lens; a second lens L2 which is a negative meniscus lens with a concave surface facing the reduction side; a third lens L3 which is a biconcave lens; and a fourth lens L4 which is a positive meniscus lens with a concave surface facing the reduction side in this order from the magnification side.

The second lens group G2 substantially consists of a fifth lens L5 which is a negative meniscus lens with a concave surface facing the reduction side; a sixth lens L6 which is a biconvex lens; and a seventh lens L7 which is a biconvex lens, in this order from the magnification side. The fifth lens L5 and the sixth lens L6 are cemented to each other.

The third lens group G3 substantially consists of an eighth lens L8 which is a positive meniscus lens with a concave surface facing the reduction side; and a ninth lens L9 which is a negative meniscus lens with a concave surface facing the reduction side, in this order from the magnification side. The eighth lens L8 and the ninth lens L9 are cemented to each other. The fourth lens group G4 substantially consists of a tenth lens L10 which is a biconcave lens and an eleventh lens L11 which is a biconvex lens in this order from the magnification side.

The fifth lens group G5 substantially consists of a twelfth lens L12 which is a biconcave lens; a thirteenth lens L13 which is a biconvex lens; and a fourteenth lens L14 which is a biconvex lens, in this order from the magnification side. The twelfth lens L12 and the thirteenth lens L13 are cemented to each other. The sixth lens group G6 substantially consists of a fifteenth lens L15 which is a biconvex lens.

A through C of Table 4 respectively show basic lens data, specs with respect to the d-line, and the distance associated with zooming of the projection zoom lens of Example 4. A of Table 4 indicates "DD[8]", "DD[13]", "DD[17]", "DD[21]", and "DD[26]" in each of the spaces of the distance between surfaces which changes while changing magnification, and C of Table 4 indicates the respective values thereof. A through L of FIG. 14 respectively shows aberration diagrams of the projection zoom lens of Example 4.

TABLE 4

A Example 4·Lens Data

| Si | Ri | Di | Ndj | ν dj |
|---|---|---|---|---|
| 1 | 8.2657 | 0.1403 | 1.71299 | 53.87 |
| 2 | −3.3503 | 0.0447 | | |
| 3 | 3.8824 | 0.0471 | 1.49700 | 81.54 |
| 4 | 1.0616 | 0.2699 | | |
| 5 | −1.1631 | 0.0406 | 1.54814 | 45.79 |
| 6 | 1.5485 | 0.1369 | | |
| 7 | 2.1799 | 0.0759 | 1.84661 | 23.78 |
| 8 | 8.9482 | DD[8] | | |
| 9 | 3.8113 | 0.0430 | 1.78472 | 25.68 |
| 10 | 1.5160 | 0.1555 | 1.63854 | 55.38 |
| 11 | −2.6763 | 0.0044 | | |
| 12 | 1.1765 | 0.1338 | 1.61800 | 63.33 |
| 13 | −19.5184 | DD[13] | | |
| 14 | 0.5651 | 0.0962 | 1.80610 | 33.27 |
| 15 | 0.6452 | 0.0871 | | |
| 16 | 1.6311 | 0.0321 | 1.60342 | 38.03 |
| 17 | 0.5133 | DD[17] | | |
| 18 | −0.8533 | 0.0300 | 1.68893 | 31.07 |
| 19 | 1.3668 | 0.0043 | | |
| 20 | 0.9952 | 0.1453 | 1.80610 | 33.27 |
| 21 | −1.1713 | DD[21] | | |
| 22 | −0.5606 | 0.0363 | 1.84661 | 23.78 |
| 23 | 1.3607 | 0.1863 | 1.49700 | 81.54 |
| 24 | −0.8008 | 0.0043 | | |
| 25 | 5.3268 | 0.1211 | 1.78472 | 25.68 |
| 26 | −1.3606 | DD[26] | | |
| 27 | 1.9814 | 0.1167 | 1.83400 | 37.16 |
| 28 | −4.0042 | 0.4415 | | |
| 29 | ∞ | 0.6397 | 1.51633 | 64.14 |
| 30 | ∞ | | | |

B Example 4·Specs (d-line)

| | Wide Angle End | Intermediate | Telephoto End |
|---|---|---|---|
| Zoom Ratio | 1.000 | 1.265 | 1.600 |
| f' | 1.000 | 1.265 | 1.600 |
| Bf | 0.863 | 0.863 | 0.863 |

TABLE 4-continued

| FNo. | 1.80 | 2.02 | 2.26 |
|---|---|---|---|
| 2ω[°] | 37.3 | 29.7 | 23.7 |

| C Example 4•Distance Associated With Zooming | | | |
|---|---|---|---|
| | Wide Angle End | Intermediate | Telephoto End |
| DD[8] | 0.7630 | 0.4033 | 0.0780 |
| DD[13] | 0.0077 | 0.0997 | 0.2904 |
| DD[17] | 0.3676 | 0.3928 | 0.2872 |
| DD[21] | 0.3651 | 0.3536 | 0.3081 |
| DD[26] | 0.0085 | 0.2625 | 0.5481 |

EXAMPLE 5

Figure 5:
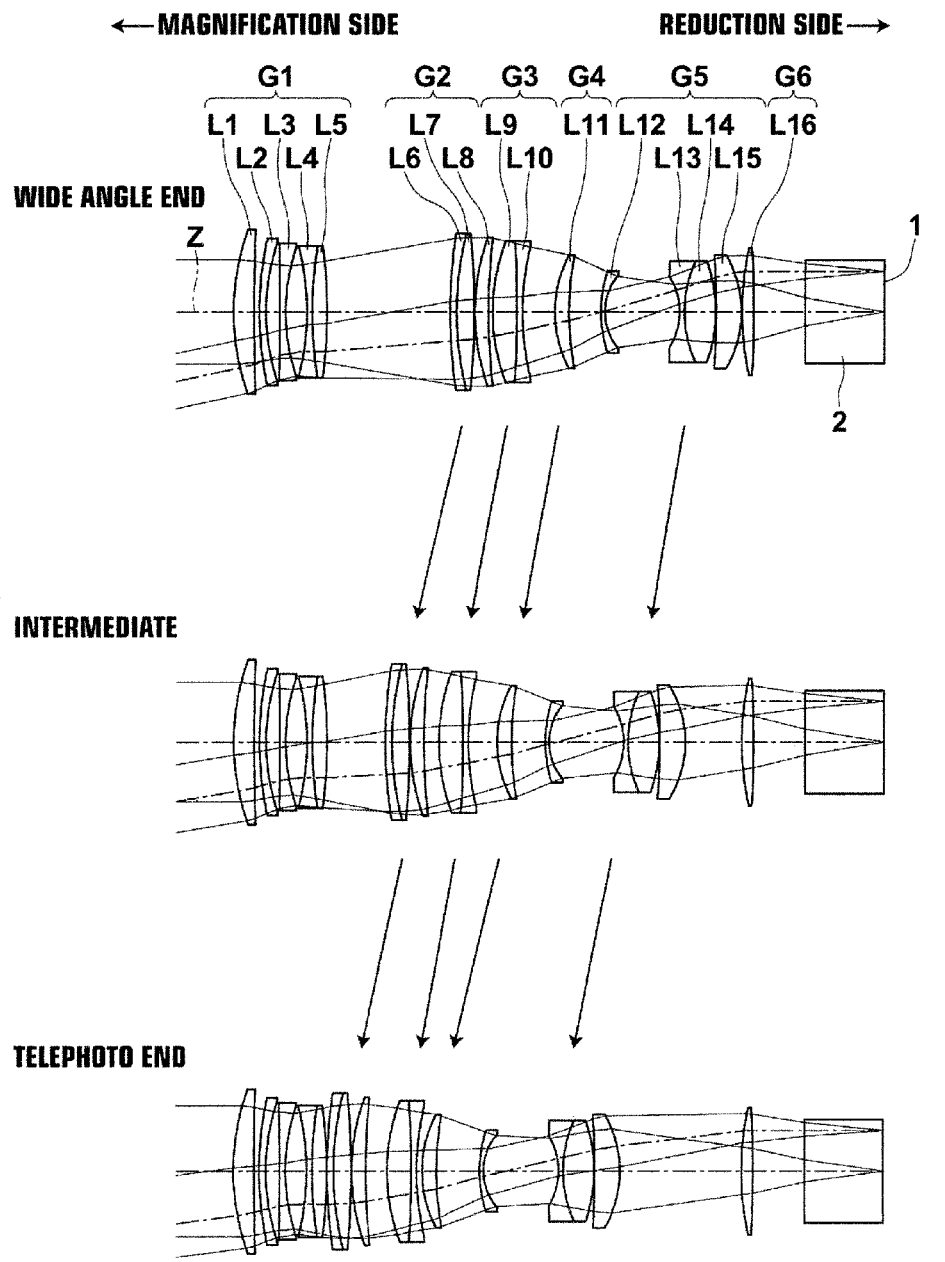
FIG. 5 is a collection of cross sectional views of a projection zoom lens according to Example 5 of the present invention, illustrating the lens configuration and light beam paths thereof.

FIG. 5 shows the lens configuration and light beam paths of the projection zoom lens according to Example 5 in each of the wide angle end, the intermediate focal length state, and the telephoto end. Regarding the six-lens-group configuration of the projection zoom lens of Example 5, the signs of the refractive powers of each of a first lens group G1 through a sixth lens group G6, the lens groups that remain fixed while changing magnification, the lens groups that move while changing magnification, and the lens group which is employed to adjust focus are the same as those of the projection zoom lens of Example 1. However, the lens configuration of each of the lens groups differs from that of Example 1 as described below.

The first lens group G1 substantially consists of a first lens L1 which is a positive meniscus lens with a concave surface facing the reduction side; a second lens L2 which is a negative meniscus lens with a concave surface facing the reduction side; a third lens L3 which is a biconcave lens; a fourth lens L4 which is a biconcave lens; and a fifth lens L5 which is a biconvex lens, in this order from the magnification side. The fourth lens L4 and the fifth lens L5 are cemented to each other.

The second lens group G2 substantially consists of a sixth lens L6 which is a negative meniscus lens with a concave surface facing the reduction side; a seventh lens L7 which is a biconvex lens; and an eighth lens L8 which is a positive meniscus lens with a concave surface facing the reduction side, in this order from the magnification side. The sixth lens L6 and the seventh lens L7 are cemented to each other.

The third lens group G3 substantially consists of a ninth lens L9 which is a biconvex lens; and a tenth lens L10 which is a biconcave lens, in this order from the magnification side. The ninth lens L9 and the tenth lens L10 are cemented to each other. The fourth lens group G4 substantially consists of an eleventh lens L11 which is a positive meniscus lens with a concave surface facing the reduction side.

The fifth lens group G5 substantially consists of a twelfth lens L12 which is a negative meniscus lens with a concave surface facing the reduction side; a thirteenth lens L13 which is a biconcave lens; a fourteenth lens L14 which is a biconvex lens; and a fifteenth lens L15 which is a positive meniscus lens with a convex surface facing the reduction side, in this order from the magnification side. The thirteenth lens L13 and the fourteenth lens L14 are cemented to each other. The sixth lens group G6 substantially consists of a sixteenth lens L16 which is a biconvex lens.

A through C of Table 5 respectively show basic lens data, specs with respect to the d-line, and the distance associated with zooming of the projection zoom lens of Example 5. A of Table 5 indicates "DD[9]", "DD[14]", "DD[17]", "DD[19]", and "DD[26]" in each of the spaces of the distance between surfaces which changes while changing magnification, and C of Table 5 indicates the respective values thereof. A through L of FIG. 15 respectively shows aberration diagrams of the projection zoom lens of Example 5.

TABLE 5

| A Example 5•Lens Data | | | | |
|---|---|---|---|---|
| Si | Ri | Di | Ndj | ν dj |
| 1 | 1.0995 | 0.1063 | 1.71299 | 53.87 |
| 2 | 13.7838 | 0.0281 | | |
| 3 | 1.5892 | 0.0339 | 1.49700 | 81.54 |
| 4 | 1.0084 | 0.0694 | | |
| 5 | −16.8695 | 0.0305 | 1.80610 | 40.92 |
| 6 | 0.9069 | 0.1093 | | |
| 7 | −1.1760 | 0.0272 | 1.80610 | 40.92 |
| 8 | 1.9894 | 0.0745 | 1.84666 | 23.78 |
| 9 | −2.2174 | DD[9] | | |
| 10 | 2.3452 | 0.0340 | 1.49700 | 81.54 |
| 11 | 1.4579 | 0.0905 | 1.58913 | 61.14 |
| 12 | −3.6220 | 0.0027 | | |
| 13 | 0.9928 | 0.0714 | 1.71299 | 53.87 |
| 14 | 3.0752 | DD[14] | | |
| 15 | 0.9219 | 0.1244 | 1.58913 | 61.14 |
| 16 | −5.0856 | 0.0271 | 1.80518 | 25.42 |
| 17 | 1.2344 | DD[17] | | |
| 18 | 0.5563 | 0.0733 | 1.63854 | 55.38 |
| 19 | 1.4131 | DD[19] | | |
| 20 | 0.6055 | 0.0203 | 1.62004 | 36.26 |
| 21 | 0.2627 | 0.3847 | | |
| 22 | −0.3060 | 0.0238 | 1.51742 | 52.43 |
| 23 | 0.5606 | 0.1600 | 1.49700 | 81.54 |
| 24 | −0.6692 | 0.0027 | | |
| 25 | −3.3040 | 0.1297 | 1.63854 | 55.38 |
| 26 | −0.5018 | DD[26] | | |
| 27 | 1.3974 | 0.0594 | 1.63854 | 55.38 |
| 28 | −5.5125 | 0.2658 | | |
| 29 | ∞ | 0.4055 | 1.51633 | 64.14 |
| 30 | ∞ | | | |

| B Example 5•Specs (d-line) | | | |
|---|---|---|---|
| | Wide Angle End | Intermediate | Telephoto End |
| Zoom Ratio | 1.000 | 1.265 | 1.600 |
| f | 1.000 | 1.265 | 1.600 |
| Bf | 0.533 | 0.533 | 0.533 |
| FNo. | 2.00 | 2.20 | 2.54 |
| 2ω[°] | 22.5 | 17.8 | 14.1 |

| C Example 5•Distance Associated With Zooming | | | |
|---|---|---|---|
| | Wide Angle End | Intermediate | Telephoto End |
| DD[9] | 0.6351 | 0.3014 | 0.0020 |
| DD[14] | 0.0203 | 0.0780 | 0.1106 |
| DD[17] | 0.1672 | 0.1463 | 0.0295 |
| DD[19] | 0.1637 | 0.1734 | 0.2245 |
| DD[26] | 0.0041 | 0.2913 | 0.6239 |

EXAMPLE 6

Figure 6:
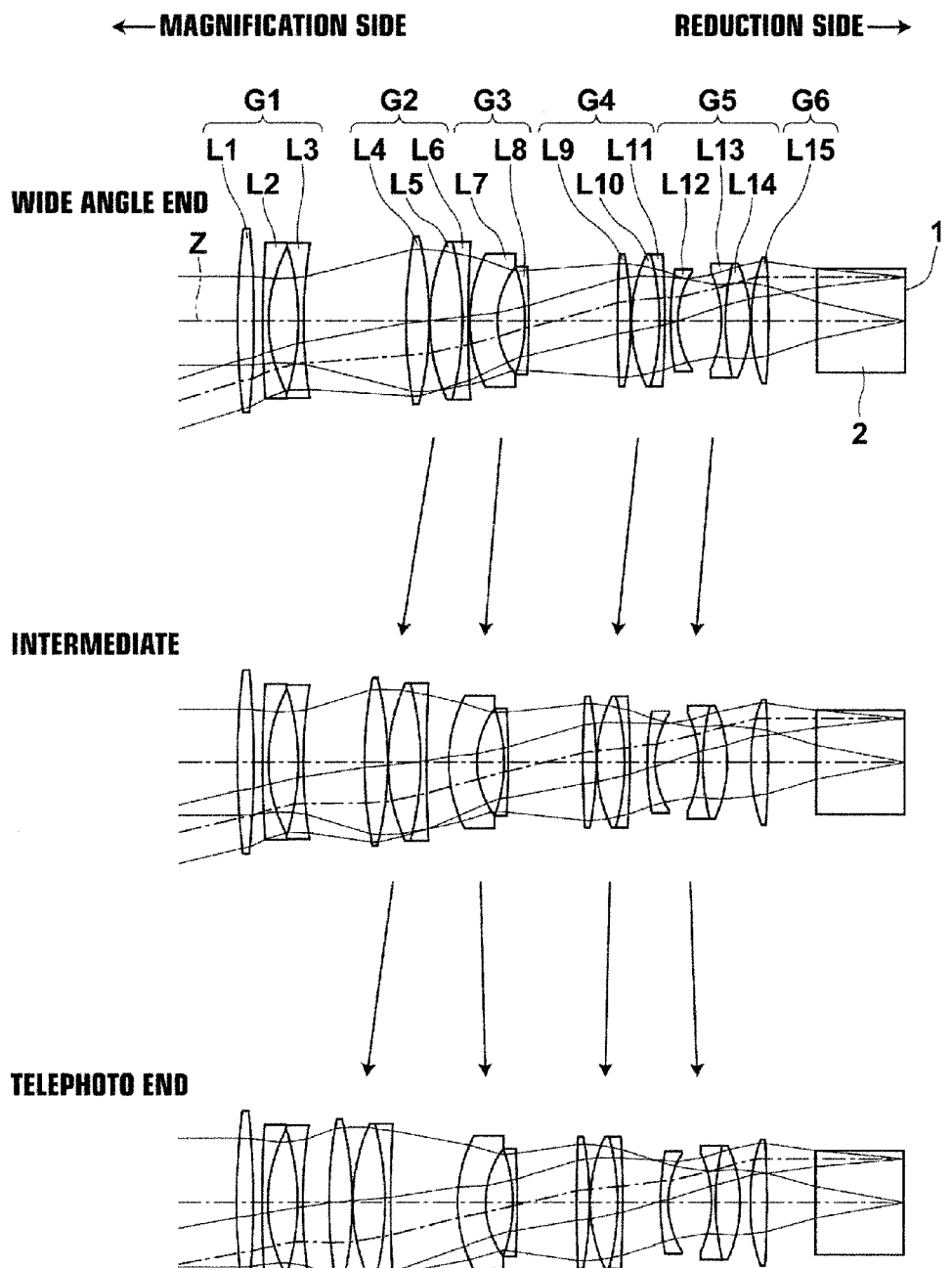
FIG. 6 is a collection of cross sectional views of a projection zoom lens according to Example 6 of the present invention, illustrating the lens configuration and light beam paths thereof.

FIG. 6 shows the lens configuration and light beam paths of the projection zoom lens according to Example 6 in each of the wide angle end, the intermediate focal length state, and the telephoto end. Regarding the six-lens-group configuration of the projection zoom lens of Example 6, the signs of the refractive powers of each of a first lens group G1 through a sixth lens group G6, the lens groups that remain fixed while changing magnification, the lens groups that move while changing magnification, and the lens group which is employed to adjust focus are the same as those of the projection zoom lens of Example 1. However, the lens configuration of each of the lens groups differs from that of Example 1 as described below.

The first lens group G1 substantially consists of a first lens L1 which is a biconvex lens; a second lens L2 which is a negative meniscus lens with a concave surface facing the reduction side; and a third lens L3 which is a biconcave lens in this order from the magnification side.

The second lens group G2 substantially consists of a fourth lens L4 which is a biconvex lens; a fifth lens L5 which is a biconvex lens; and a sixth lens L6 which is a biconcave lens in this order from the magnification side. The fifth lens L5 and the sixth lens L6 are cemented to each other.

The third lens group G3 substantially consists of a seventh lens L7 which is a negative meniscus lens with a concave surface facing the reduction side; and an eighth lens L8 which is a negatives meniscus lens with a concave surface facing the magnification side, in this order from the magnification side.

The fourth lens group G4 substantially consists of a ninth lens L9 which is a biconvex lens; a tenth lens L10 which is a biconvex lens; and an eleventh lens L11 which is a negative meniscus lens with a concave surface facing the magnification side, in this order form the magnification side. The tenth lens L10 and the eleventh lens L11 are cemented to each other.

The fifth lens group G5 substantially consists of a twelfth lens L12 which is a negative meniscus lens with a concave surface facing the reduction side; a thirteenth lens L13 which is a biconcave lens; and a fourteenth lens L14 which is a biconvex lens, in this order from the magnification side. The thirteenth lens L13 and the fourteenth lens L14 are cemented to each other. The sixth lens group G6 substantially consists of a fifteenth lens L15 which is a biconvex lens.

A through C of Table 6 respectively show basic lens data, specs with respect to the d-line, and the distance associated with zooming of the projection zoom lens of Example 6. A of Table 6 indicates "DD[6]", "DD[11]", "DD[15]", "DD[20]", and "DD[25]" in each of the spaces of the distance between surfaces which changes while changing magnification, and C of Table 6 indicates the respective values thereof. A through L of FIG. 16 respectively shows aberration diagrams of the projection zoom lens of Example 6.

TABLE 6

A Example 6•Lens Data

| Si | Ri | Di | Ndj | ν dj |
|---|---|---|---|---|
| 1 | 4.6017 | 0.1165 | 1.80518 | 25.42 |
| 2 | −5.6641 | 0.0626 | | |
| 3 | 7.7234 | 0.0409 | 1.49700 | 81.61 |
| 4 | 0.9738 | 0.2088 | | |
| 5 | −1.5001 | 0.0387 | 1.66680 | 33.05 |
| 6 | 3.1154 | DD[6] | | |
| 7 | 2.8057 | 0.1650 | 1.77250 | 49.60 |
| 8 | −2.1564 | 0.0043 | | |
| 9 | 1.1971 | 0.2299 | 1.61800 | 63.33 |
| 10 | −1.9137 | 0.0398 | 1.78472 | 25.68 |
| 11 | 8.4655 | DD[11] | | |
| 12 | 0.9333 | 0.1951 | 1.60311 | 60.64 |
| 13 | 0.5644 | 0.1931 | | |
| 14 | −0.9834 | 0.0301 | 1.61340 | 44.27 |
| 15 | −6.4588 | DD[15] | | |
| 16 | 7.0306 | 0.0940 | 1.80809 | 22.76 |
| 17 | −2.0842 | 0.0043 | | |
| 18 | 0.9543 | 0.1959 | 1.49700 | 81.61 |
| 19 | −1.5681 | 0.0366 | 1.51742 | 52.43 |
| 20 | −6.8326 | DD[20] | | |
| 21 | 1.8482 | 0.0534 | 1.51742 | 52.43 |
| 22 | 0.5759 | 0.3077 | | |
| 23 | −0.7127 | 0.0292 | 1.78472 | 25.68 |
| 24 | 1.4817 | 0.1733 | 1.72916 | 54.68 |
| 25 | −0.8505 | DD[25] | | |
| 26 | 1.2070 | 0.1206 | 1.77250 | 49.60 |
| 27 | −6.0440 | 0.3443 | | |
| 28 | ∞ | 0.6235 | 1.51633 | 64.14 |
| 29 | ∞ | | | |

B Example 6•Specs (d-line)

| | Wide Angle End | Intermediate | Telephoto End |
|---|---|---|---|
| Zoom Ratio | 1.000 | 1.304 | 1.700 |
| f | 1.000 | 1.304 | 1.700 |
| Bf | 0.756 | 0.756 | 0.756 |
| FNo. | 1.70 | 1.85 | 2.00 |
| 2ω[°] | 32.5 | 25.2 | 19.3 |

C Example 6•Distance Associated With Zooming

| | Wide Angle End | Intermediate | Telephoto End |
|---|---|---|---|
| DD[6] | 0.7224 | 0.4319 | 0.1836 |
| DD[11] | 0.0109 | 0.1616 | 0.4729 |
| DD[15] | 0.6294 | 0.5297 | 0.4212 |
| DD[20] | 0.0407 | 0.1236 | 0.2648 |
| DD[25] | 0.0108 | 0.1674 | 0.0716 |

EXAMPLE 7

Figure 7:
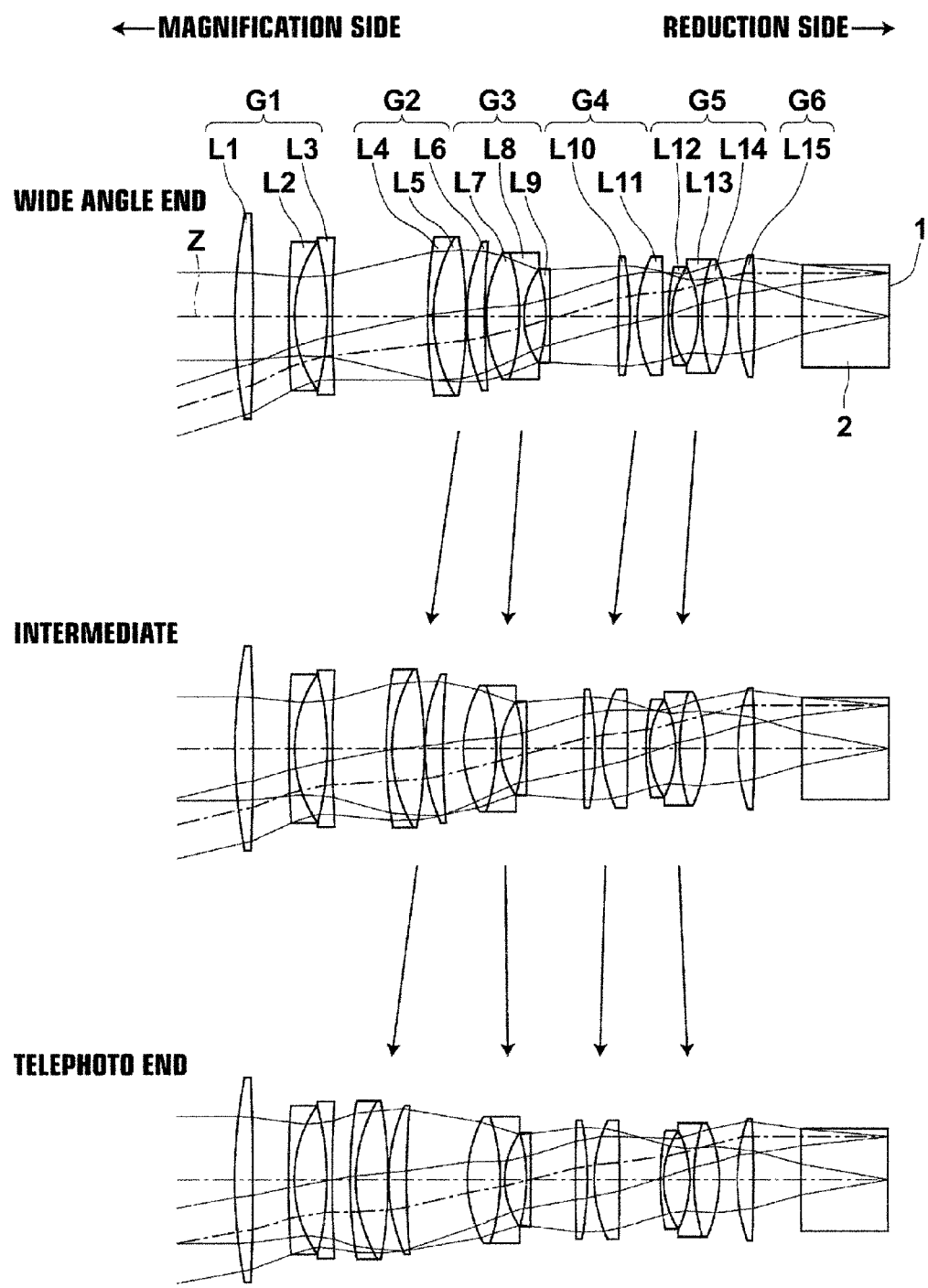
FIG. 7 is a collection of cross sectional views of a projection zoom lens according to Example 7 of the present invention, illustrating the lens configuration and light beam paths thereof.

FIG. 7 shows the lens configuration and light beam paths of the projection zoom lens according to Example 7 in each of the wide angle end, the intermediate focal length state, and the telephoto end. The projection zoom lens according to Example 7 has a configuration substantially similar to that of the projection zoom lens according to Example 6, but differs from the projection zoom lens according to Example 6 in the following points: The second lens group G2 substantially consists of a fourth lens L4 which is a negative meniscus lens with a concave surface facing the reduction side, a fifth lens L5 which is a biconvex lens, and a sixth lens which is a positive meniscus lens with a concave surface facing the reduction side in this order from the magnification side; the fourth lens L4 and the fifth lens L5 are cemented to each other; and the third lens group G3 substantially consists of a seventh lens L7 which is a biconvex lens, an eighth lens L8 which is a biconcave lens, and a ninth lens L9 which is a negative meniscus lens with a concave lens facing the magnification side, in this order from the magnification side; the seventh lens L7 and the eighth lens L8 are cemented to each other; and the fourth lens group G4 substantially consists of a tenth lens L10 which is a biconvex lens and an eleventh lens L11 which is a biconvex lens in this order from the magnification side.

A through C of Table 7 respectively show basic lens data, specs with respect to the d-line, and the distance associated with zooming of the projection zoom lens of Example 7. A of Table 7 indicates "DD[6]", "DD[11]", "DD[16]", "DD[20]", and "DD[25]" in each of the spaces of the distance between surfaces which changes while changing magnification, and C of Table 7 indicates the respective values thereof. A through L of FIG. 17 respectively shows aberration diagrams of the projection zoom lens of Example 7.

TABLE 7

A Example 7•Lens Data

| Si | Ri | Di | Ndi | ν dj |
|---|---|---|---|---|
| 1 | 3.3780 | 0.1308 | 1.80100 | 34.97 |
| 2 | −14.5055 | 0.2517 | | |
| 3 | 7.3990 | 0.0407 | 1.48749 | 70.23 |

TABLE 7-continued

| | | | | |
|---|---|---|---|---|
| 4 | 0.8386 | 0.2344 | | |
| 5 | −1.8291 | 0.0386 | 1.83400 | 37.16 |
| 6 | 8.3972 | DD[6] | | |
| 7 | 3.0928 | 0.0404 | 1.80518 | 25.42 |
| 8 | 0.9880 | 0.2327 | 1.77250 | 49.60 |
| 9 | −2.6054 | 0.0043 | | |
| 10 | 1.1570 | 0.1303 | 1.61800 | 63.33 |
| 11 | 5.8673 | DD[11] | | |
| 12 | 0.8370 | 0.2360 | 1.66680 | 33.05 |
| 13 | −1.2583 | 0.0322 | 1.65412 | 39.68 |
| 14 | 0.5188 | 0.1559 | | |
| 15 | −1.0458 | 0.0300 | 1.60342 | 38.03 |
| 16 | −24.6470 | DD[16] | | |
| 17 | 14.0362 | 0.0850 | 1.80518 | 25.42 |
| 18 | −1.9729 | 0.0517 | | |
| 19 | 0.8783 | 0.1813 | 1.49700 | 81.61 |
| 20 | −11.3473 | DD[20] | | |
| 21 | 1.4794 | 0.0257 | 1.51742 | 52.43 |
| 22 | 0.5758 | 0.1867 | | |
| 23 | −0.6942 | 0.0291 | 1.75520 | 27.51 |
| 24 | 1.2296 | 0.1828 | 1.72916 | 54.68 |
| 25 | −0.8469 | DD[25] | | |
| 26 | 1.2047 | 0.1180 | 1.77250 | 49.60 |
| 27 | −6.8317 | 0.3430 | | |
| 28 | ∞ | 0.6216 | 1.51633 | 64.14 |
| 29 | ∞ | | | |

B Example 7•Specs (d-line)

| | Wide Angle End | Intermediate | Telephoto End |
|---|---|---|---|
| Zoom Ratio | 1.000 | 1.304 | 1.700 |
| f | 1.000 | 1.304 | 1.700 |
| Bf | 0.753 | 0.753 | 0.753 |
| FNo. | 1.70 | 1.87 | 2.00 |
| 2ω[°] | 32.4 | 25.1 | 19.3 |

C Example 7•Distance Associated With Zooming

| | Wide Angle End | Intermediate | Telephoto End |
|---|---|---|---|
| DD[6] | 0.6835 | 0.3870 | 0.1284 |
| DD[11] | 0.0108 | 0.1457 | 0.4334 |
| DD[16] | 0.4921 | 0.4080 | 0.3215 |
| DD[20] | 0.0391 | 0.1272 | 0.2884 |
| DD[25] | 0.0749 | 0.2326 | 0.1286 |

EXAMPLE 8

FIG. 8 shows the lens configuration and light beam paths of the projection zoom lens according to Example 8 in each of the wide angle end, the intermediate focal length state, and the telephoto end. Regarding the six-lens-group configuration of the projection zoom lens of Example 8, the signs of the refractive powers of each of a first lens group G1 through a sixth lens group G6, the lens groups that remain fixed while changing magnification, the lens groups that move while changing magnification, and the lens group which is employed to adjust focus are the same as those of the projection zoom lens of Example 1. However, the lens configuration of each of the lens groups differs from that of Example 1 as described below.

The first lens group G1 substantially consists of a first lens L1 which is a biconvex lens; a second lens L2 which is a negative meniscus lens with a concave surface facing the reduction side; a third lens L3 which is a biconcave lens; and a fourth lens L4 which is a positive meniscus lens with a concave surface facing the reduction side, in this order from the magnification side. The third lens L3 and the fourth lens L4 are cemented to each other.

The second lens group G2 substantially consists of a fifth lens L5 which is a negative meniscus lens with a concave surface facing the reduction side; a sixth lens L6 which is a biconvex lens; and a seventh lens L7 which is a biconvex lens. The fifth lens L5 and the sixth lens L6 are cemented to each other.

The third lens group G3 substantially consists of an eighth lens L8 which is a positive meniscus lens with a concave surface facing the reduction side; and a ninth lens L9 which is a negative meniscus lens with a concave surface facing the reduction side, in this order from the magnification side. The fourth lens group G4 substantially consists of a tenth lens L10 which is a negative meniscus lens with a concave surface facing the magnification side; and an eleventh lens L11 which is a biconvex lens, in this order from the magnification side.

The fifth lens group G5 substantially consists of a twelfth lens L12 which is a biconcave lens; and a thirteenth lens L13 which is a biconvex lens, in this order from the magnification side. The sixth lens group G6 substantially consists of a fourteenth lens L14 which is a biconvex lens.

A through C of Table 8 respectively show basic lens data, specs with respect to the d-line, and the distance associated with zooming of the projection zoom lens of Example 8. A of Table 8 indicates "DD[7]", "DD[12]", "DD[16]", "DD[20]", and "DD[24]" in each of the spaces of the distance between surfaces which changes while changing magnification, and C of Table 8 indicates the respective values thereof. A through L of FIG. 18 respectively shows aberration diagrams of the projection zoom lens of Example 8.

TABLE 8

A Example 8•Lens Data

| Si | Ri | Di | Ndj | ν dj |
|---|---|---|---|---|
| 1 | 1.2633 | 0.1084 | 1.71300 | 53.87 |
| 2 | −10.4974 | 0.1354 | | |
| 3 | 1.9906 | 0.0406 | 1.49700 | 81.54 |
| 4 | 0.8750 | 0.1815 | | |
| 5 | −1.0952 | 0.0272 | 1.74320 | 49.34 |
| 6 | 0.6091 | 0.0523 | 1.80518 | 25.42 |
| 7 | 1.2250 | DD[7] | | |
| 8 | 1.0884 | 0.0227 | 1.80518 | 25.42 |
| 9 | 0.5404 | 0.1178 | 1.61800 | 63.33 |
| 10 | −2.5711 | 0.0018 | | |
| 11 | 0.5761 | 0.1079 | 1.49700 | 81.54 |
| 12 | −2.1995 | DD[12] | | |
| 13 | 0.4000 | 0.0573 | 1.67003 | 47.23 |
| 14 | 0.4930 | 0.0351 | | |
| 15 | 1.3300 | 0.0216 | 1.58144 | 40.75 |
| 16 | 0.3267 | DD[16] | | |
| 17 | −0.3477 | 0.0181 | 1.54814 | 45.79 |
| 18 | −29.3020 | 0.0450 | | |
| 19 | 3.6496 | 0.0556 | 1.80100 | 34.97 |
| 20 | −0.5268 | DD[20] | | |
| 21 | −0.3358 | 0.0235 | 1.60342 | 38.03 |
| 22 | 1.3002 | 0.0402 | | |
| 23 | 1.7202 | 0.1096 | 1.62041 | 60.29 |
| 24 | −0.4595 | DD[24] | | |
| 25 | 0.8660 | 0.0593 | 1.71300 | 53.87 |
| 26 | −31.2680 | 0.1531 | | |
| 27 | ∞ | 0.4269 | 1.51633 | 64.14 |
| 28 | ∞ | | | |

B Example 8•Specs (d-line)

| | Wide Angle End | Intermediate | Telephoto End |
|---|---|---|---|
| Zoom Ratio | 1.000 | 1.304 | 1.700 |
| f | 1.000 | 1.304 | 1.700 |
| Bf | 0.435 | 0.435 | 0.435 |
| FNo. | 2.20 | 2.47 | 2.73 |
| 2ω[°] | 22.2 | 17.0 | 13.0 |

TABLE 8-continued

C Example 8•Distance Associated With Zooming

| | Wide Angle End | Intermediate | Telephoto End |
|---|---|---|---|
| DD[7] | 0.5123 | 0.2655 | 0.0411 |
| DD[12] | 0.0099 | 0.0417 | 0.1517 |
| DD[16] | 0.1864 | 0.1888 | 0.1371 |
| DD[20] | 0.3403 | 0.3052 | 0.1679 |
| DD[24] | 0.0101 | 0.2577 | 0.5612 |

EXAMPLE 9

Figure 9:
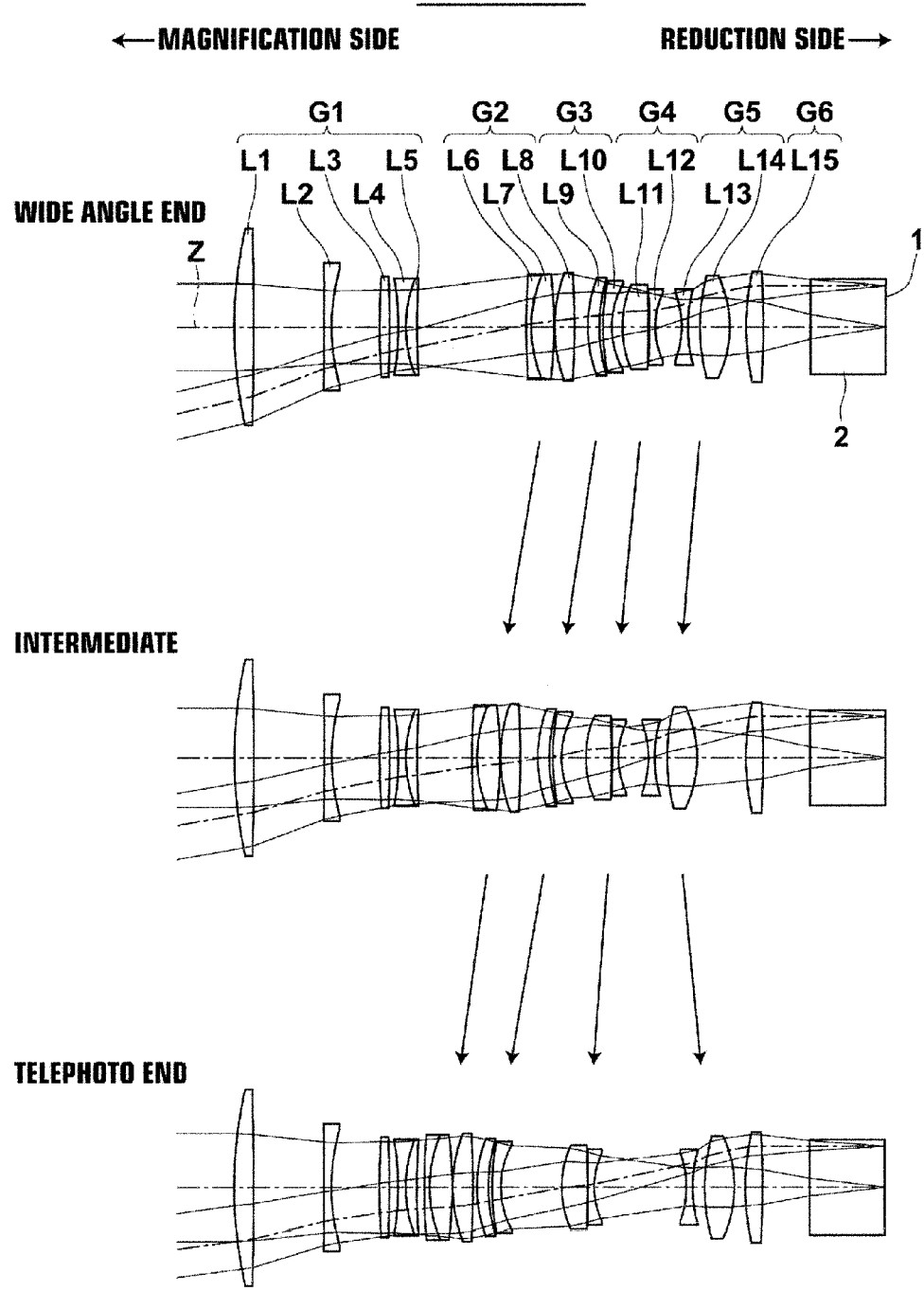
FIG. 9 is a collection of cross sectional views of a projection zoom lens according to Example 9 of the present invention, illustrating the lens configuration and light beam paths thereof.

FIG. 9 shows the lens configuration and light beam paths of the projection zoom lens according to Example 9 in each of the wide angle end, the intermediate focal length state, and the telephoto end. Regarding the six-lens-group configuration of the projection zoom lens of Example 9, the signs of the refractive powers of each of a first lens group G1 through a sixth lens group G6, the lens groups that remain fixed while changing magnification, the lens groups that move while changing magnification, and the lens group which is employed to adjust focus are the same as those of the projection zoom lens of Example 1. However, the lens configuration of each of the lens groups differs from that of Example 1 as described below.

The first lens group G1 substantially consists of a first lens L1 which is a biconvex lens; a second lens L2 which is a biconcave lens; a third lens L3 which is a biconvex lens; a fourth lens L4 which is a biconcave lens; and a fifth lens L5 which is a positive meniscus lens with a concave surface facing the reduction side, in this order from the magnification side. The fourth lens L4 and the fifth lens L5 are cemented to each other.

The second lens group G2 substantially consists of a sixth lens L6 which is a negative meniscus lens with a concave surface facing the reduction side; a seventh lens L7 which is a biconvex lens; and an eighth lens L8 which is a biconvex lens in this order from the magnification. The sixth lens L6 and the seventh lens L7 are cemented to each other.

The third lens group G3 substantially consists of a ninth lens L9 which is a positive meniscus lens with a concave surface facing the reduction side; and a tenth lens L10 which is a negative meniscus lens with a concave surface facing the reduction side, in this order from the magnification side. The fourth lens group G4 substantially consists of an eleventh lens L11 which is a biconvex lens and a twelfth lens L12 which is a biconcave lens, in this order from the magnification side.

The fifth lens group G5 substantially consists of a thirteenth lens L13 which is a biconcave lens; and a fourteenth lens L14 which is a biconvex lens, in this order from the magnification side. The sixth lens group G6 substantially consists of a fifteenth lens L15 which is a biconvex lens.

A through C of Table 9 respectively show basic lens data, specs with respect to the d-line, and the distance associated with zooming of the projection zoom lens of Example 9. A of Table 9 indicates "DD[9]", "DD[14]", "DD[18]", "DD[22]", and "DD[26]" in each of the spaces of the distance between surfaces which changes while changing magnification, and C of Table 9 indicates the respective values thereof. A through L of FIG. 13 respectively shows aberration diagrams of the projection zoom lens of Example 9.

TABLE 9

A Example 9•Lens Data

| Si | Ri | Di | Ndj | ν dj |
|---|---|---|---|---|
| 1 | 2.2285 | 0.1070 | 1.72342 | 37.95 |
| 2 | −23.7984 | 0.3925 | | |
| 3 | −15.5977 | 0.0408 | 1.49700 | 81.54 |
| 4 | 1.0422 | 0.2685 | | |
| 5 | 3.6444 | 0.0552 | 1.58913 | 61.14 |
| 6 | −7.5053 | 0.0492 | | |
| 7 | −1.3709 | 0.0427 | 1.72047 | 34.71 |
| 8 | 0.6475 | 0.0619 | 1.75520 | 27.51 |
| 9 | 3.0062 | DD[9] | | |
| 10 | 4.1742 | 0.0281 | 1.64769 | 33.79 |
| 11 | 0.6615 | 0.1271 | 1.49700 | 81.54 |
| 12 | −1.9792 | 0.0028 | | |
| 13 | 0.7586 | 0.1113 | 1.58913 | 61.14 |
| 14 | −4.4004 | DD[14] | | |
| 15 | 0.6816 | 0.0638 | 1.69680 | 55.53 |
| 16 | 0.8205 | 0.0207 | | |
| 17 | 1.2045 | 0.0486 | 1.51742 | 52.43 |
| 18 | 0.4353 | DD[18] | | |
| 19 | 0.5136 | 0.1439 | 1.77250 | 49.60 |
| 20 | −7.0378 | 0.0049 | | |
| 21 | −4.2290 | 0.0336 | 1.51742 | 52.43 |
| 22 | 0.3983 | DD[22] | | |
| 23 | −0.4797 | 0.0342 | 1.53172 | 48.84 |
| 24 | 0.6889 | 0.0687 | | |
| 25 | 0.9798 | 0.1648 | 1.49700 | 81.54 |
| 26 | −0.5838 | DD[26] | | |
| 27 | 1.2248 | 0.0975 | 1.77250 | 49.60 |
| 28 | −3.9486 | 0.2649 | | |
| 29 | ∞ | 0.4178 | 1.51633 | 64.14 |
| 30 | ∞ | | | |

B Example 9•Specs (d-line)

| | Wide Angle End | Intermediate | Telephoto End |
|---|---|---|---|
| Zoom Ratio | 1.000 | 1.304 | 1.700 |
| f | 1.000 | 1.304 | 1.700 |
| Bf | 0.540 | 0.540 | 0.540 |
| FNo. | 2.20 | 2.51 | 3.02 |
| 2ω[°] | 24.4 | 18.7 | 14.3 |

C Example 9•Distance Associated With Zooming

| | Wide Angle End | Intermediate | Telephoto End |
|---|---|---|---|
| DD[9] | 0.6084 | 0.3068 | 0.0445 |
| DD[14] | 0.0774 | 0.0944 | 0.0219 |
| DD[18] | 0.0589 | 0.1543 | 0.3420 |
| DD[22] | 0.1455 | 0.1773 | 0.5124 |
| DD[26] | 0.0920 | 0.2494 | 0.0613 |

EXAMPLE 10

Figure 10:
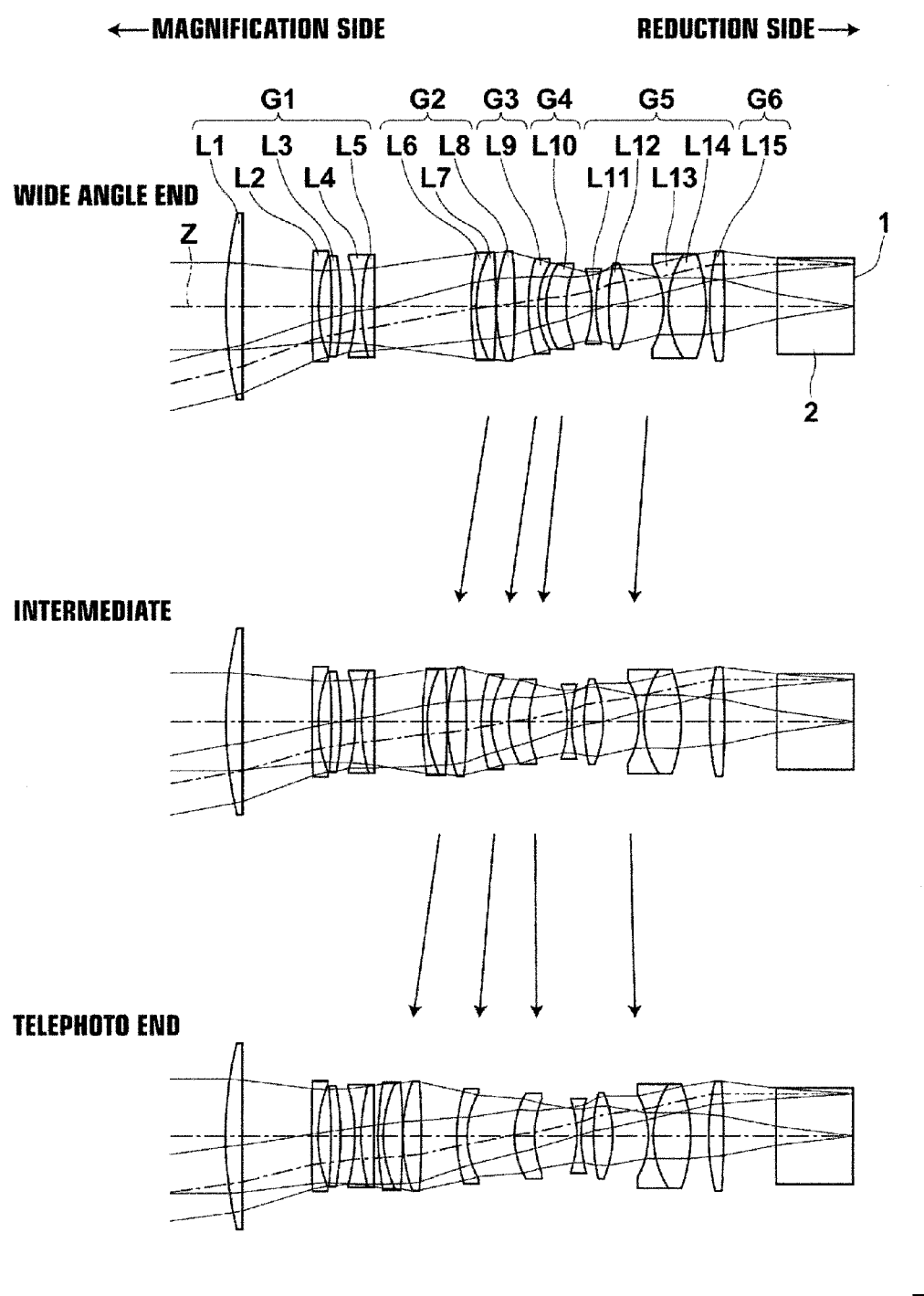
FIG. 10 is a collection of cross sectional views of a projection zoom lens according to Example 10 of the present invention, illustrating the lens configuration and light beam paths thereof.

FIG. 10 shows the lens configuration and light beam paths of the projection zoom lens according to Example 10 in each of the wide angle end, the intermediate focal length state, and the telephoto end. Regarding the six-lens-group configuration of the projection zoom lens of Example 4, the signs of the refractive powers of each of a first lens group G1 through a sixth lens group G6, the lens groups that remain fixed while changing magnification, the lens groups that move while changing magnification, and the lens group which is employed to adjust focus are the same as those of the projection zoom lens of Example 1. However, the lens configuration of each of the lens groups differs from that of Example 1 as described below.

The first lens group G1 substantially consists of a first lens L1 which is a planoconvex lens with a plane surface facing the reduction side; a second lens L2 which is a negative meniscus lens with a concave surface facing the reduction side; a third lens L3 which is a positive meniscus lens with a convex surface facing the reduction side; a fourth lens L4 which is a biconcave lens; and a fifth lens L5 which is a planoconvex lens with a plane surface facing the reduction side, in this order from the magnification side. The fourth lens L4 and the fifth lens L5 are cemented to each other.

The second lens group G2 substantially consists of a sixth lens L6 which is a negative meniscus lens with a concave surface facing the reduction side; a seventh lens L7 which is a biconvex lens; and an eighth lens L8 which is a biconvex lens, in this order from the magnification side. The sixth lens L6 and the seventh lens L7 are cemented to each other. The thirteenth lens group G3 substantially consists of a ninth lens L9 which is a negative meniscus lens with a concave surface facing the reduction side.

The fourth lens group G4 substantially consists of a tenth lens L10 which is a positive meniscus lens with a concave surface facing the reduction side. The fifth lens group G5 substantially consists of an eleventh lens L11 which is a biconcave lens; a twelfth lens L12 which is a biconvex lens; a thirteenth lens L13 which is a biconcave lens; and a fourteenth lens L14 which is a biconvex lens, in this order from the magnification side. The thirteenth lens L13 and the fourteenth lens L14 are cemented to each other. The sixth lens group G6 substantially consists of a fifteenth lens L15 which is a biconvex lens.

A through C of Table 10 respectively show basic lens data, specs with respect to the d-line, and the distance associated with zooming of the projection zoom lens of Example 10. A of Table 6 indicates "DD[9]", "DD[14]", "DD[16]", "DD[18]", and "DD[25]" in each of the spaces of the distance between surfaces which changes while changing magnification, and C of Table 10 indicates the respective values thereof. A through L of FIG. 20 respectively shows aberration diagrams of the projection zoom lens of Example 10.

TABLE 10

A Example 10•Lens Data

| Si | Ri | Di | Ndj | νdj |
|---|---|---|---|---|
| 1 | 1.9343 | 0.0929 | 1.72342 | 37.95 |
| 2 | ∞ | 0.3878 | | |
| 3 | 10.0481 | 0.0357 | 1.51633 | 64.14 |
| 4 | 0.6784 | 0.0732 | | |
| 5 | −2.9313 | 0.0532 | 1.63854 | 55.38 |
| 6 | −1.3293 | 0.0794 | | |

TABLE 10-continued

| 7 | −0.8714 | 0.0359 | 1.65412 | 39.68 |
|---|---|---|---|---|
| 8 | 0.9599 | 0.0715 | 1.72825 | 28.46 |
| 9 | ∞ | DD[9] | | |
| 10 | 1.5323 | 0.0288 | 1.74000 | 28.30 |
| 11 | 0.6099 | 0.1082 | 1.49700 | 81.54 |
| 12 | −4.1877 | 0.0028 | | |
| 13 | 0.8022 | 0.1036 | 1.69680 | 55.53 |
| 14 | −3.1732 | DD[14] | | |
| 15 | 0.7869 | 0.0572 | 1.53172 | 48.84 |
| 16 | 0.4302 | DD[16] | | |
| 17 | 0.4209 | 0.1141 | 1.62041 | 60.29 |
| 18 | 0.4944 | DD[18] | | |
| 19 | −0.5303 | 0.0243 | 1.65844 | 50.88 |
| 20 | 0.6895 | 0.0698 | | |
| 21 | 0.9790 | 0.1066 | 1.71700 | 47.92 |
| 22 | −0.5320 | 0.1984 | | |
| 23 | −0.4168 | 0.0273 | 1.53172 | 48.84 |
| 24 | 0.4867 | 0.2098 | 1.49700 | 81.54 |
| 25 | −0.7239 | DD[25] | | |
| 26 | 1.2051 | 0.0821 | 1.77250 | 49.60 |
| 27 | −3.7984 | 0.2966 | | |
| 28 | ∞ | 0.4286 | 1.51633 | 64.14 |
| 29 | ∞ | | | |

B Example 10•Specs (d-line)

| | Wide Angle End | Intermediate | Telephoto End |
|---|---|---|---|
| Zoom Ratio | 1.000 | 1.304 | 1.700 |
| f | 1.000 | 1.304 | 1.700 |
| Bf | 0.579 | 0.579 | 0.579 |
| FNo. | 2.20 | 2.53 | 2.86 |
| 2ω[°] | 25.1 | 19.2 | 14.7 |

C Example 10•Distance Associated With Zoom

| | Wide Angle End | Intermediate | Telephoto End |
|---|---|---|---|
| DD[9] | 0.5397 | 0.2688 | 0.0234 |
| DD[14] | 0.0742 | 0.0902 | 0.1961 |
| DD[16] | 0.0438 | 0.1092 | 0.2644 |
| DD[18] | 0.1426 | 0.2056 | 0.2367 |
| DD[25] | 0.0221 | 0.1486 | 0.1017 |

Table 11 shows values respectively corresponding to conditional expressions (1), (2), (2'), (3), (3'), and (3") of Examples 1 through 10 as described above; values related to these conditional expressions; and the focal length of each of the lens groups. In Table 11, f1 is the focal length of the first lens group G1, f2 is the focal length of the second lens group G2, f3 is the focal length of the third lens group G3, f4 is the focal length of the fourth lens group G4, f5 is the focal length of the fifth lens group G5, and f6 is the focal length of the sixth lens group G6.

TABLE 11

| Conditional Expression | | Example 1 | Example 2 | Example 3 | Example 4 | Example 5 | Example 6 | Example 7 | Example 8 | Example 9 | Example 10 |
|---|---|---|---|---|---|---|---|---|---|---|---|
| (1) | ft/fw | 1.70 | 1.80 | 1.60 | 1.60 | 1.60 | 1.70 | 1.70 | 1.70 | 1.70 | 1.70 |
| (2) | f5/f3 | 2.39 | 1.21 | 1.12 | 7.69 | 1.18 | 1.15 | 1.27 | 4.38 | 2.41 | 1.69 |
| (2') | | | | | | | | | | | |
| (3) | νdp − νdn | 18.24 | 19.07 | 36.58 | 29.83 | 24.12 | 15.62 | 14.71 | 22.26 | 32.70 | 14.87 |
| (3') | | | | | | | | | | | |
| (3") | | | | | | | | | | | |
| fw | | 1.00 | 1.00 | 1.00 | 1.00 | 1.00 | 1.00 | 1.00 | 1.00 | 1.00 | 1.00 |
| ft | | 1.70 | 1.80 | 1.60 | 1.60 | 1.60 | 1.70 | 1.70 | 1.70 | 1.70 | 1.70 |
| f1 | | −1.62 | −1.39 | −1.86 | −1.94 | −1.58 | −1.31 | −1.44 | −1.63 | −2.10 | −1.80 |
| f2 | | 1.04 | 2.51 | 1.30 | 1.12 | 1.09 | 1.02 | 1.07 | 0.61 | 0.92 | 0.79 |
| f3 | | −1.63 | −23.52 | −2.18 | −2.28 | −66.19 | −1.16 | −1.25 | −1.20 | −2.01 | −1.89 |
| f4 | | 1.32 | 2.36 | 0.91 | 4.22 | 1.39 | 0.94 | 0.95 | 2.51 | 2.46 | 2.86 |
| f5 | | −3.89 | −28.36 | −2.45 | −17.51 | −77.86 | −1.34 | −1.58 | −5.26 | −4.83 | −3.20 |
| f6 | | 1.93 | 3.12 | 1.69 | 1.60 | 1.75 | 0.60 | 0.60 | 1.18 | 1.22 | 1.19 |
| νdp | | 68.44 | 42.85 | 67.71 | 53.61 | 68.46 | 54.68 | 54.68 | 60.29 | 81.54 | 64.73 |
| νdn | | 50.20 | 23.78 | 31.12 | 23.78 | 44.34 | 39.06 | 39.97 | 38.03 | 48.84 | 49.86 |

The present invention has been described with reference to the Embodiments and Examples. The projection zoom lens of the present invention is not limited to the Examples described above, and various modifications are possible. For example, values, such as the radius of curvature of each lens, the distances between surfaces, the refractive indices, and the Abbe numbers can be varied as appropriate.

Further, the projection type display device of the present invention is also not limited to the configurations described above. For example, the light valves to be used and optical members used for the beam separation or beam composition are not limited to the above configurations, and various modifications are possible.

What is claimed is:

1. A projection zoom lens that substantially consists of six lens groups in which a first lens group having negative refractive power, a second lens group having positive refractive power, a third lens group having negative refractive power, a fourth lens group having positive refractive power, a fifth lens group having negative refractive power, and a sixth lens group having positive refractive power are disposed in this order from a magnification side;

wherein the reduction side is made telecentric, wherein the second lens group, the third lens group, the fourth lens group, and the fifth lens group are moved and the first lens group and the sixth lens group are fixed while changing magnification, and wherein conditional expressions (1) and (2) below are satisfied:

$$1.5 < ft/fw \qquad (1), \text{and}$$

$$0.5 < f5/f3 < 10.0 \qquad (2), \text{where}$$

ft: the focal length of the entire system at the telephoto end
fw: the focal length of the entire system at the wide angle end
f5: the focal length of the fifth lens group, and
f3: the focal length of the third lens group.

2. The projection zoom lens of claim 1, wherein focus adjustment is performed by moving the first lens group in the optical axis direction.

3. The projection zoom lens of claim 1, wherein the first lens group includes at least two negative lenses with a concave surface facing the reduction side.

4. The projection zoom lens of claim 1, wherein the first lens group includes at least one negative lens having the Abbe number of not lower than 50 with respect to a d-line.

5. The projection zoom lens of claim 1, wherein a negative lens with a concave surface facing the reduction side is disposed on the most magnification side of the fifth lens group.

6. The projection zoom lens of claim 1, wherein a positive lens with a convex surface facing the reduction side is disposed on the most reduction side of the fifth lens group.

7. The projection zoom lens of claim 1, wherein the fifth lens group includes at least one positive lens having the Abbe number of not lower than 50 with respect to the d-line.

8. The projection zoom lens of claim 1, wherein conditional expression (3) below is satisfied:

$$10.0 < vdp - vdn < 60.0 \qquad (3)$$

vdp: the average value of the Abbe number with respect to the d-line of positive lenses included in the fifth lens group, and
vdn: the average value of the Abbe number with respect to the d-line of negative lenses included in the fifth lens group.

9. The projection zoom lens of claim 1, wherein the sixth lens group substantially consists of one positive lens with a convex surface facing the magnification side.

10. The projection zoom lens of claim 1, wherein conditional expression (2') below is satisfied $$1.0 < f5/f3 < 8.0 \qquad (2').$$

11. The projection zoom lens of claim 1, wherein conditional expression (3') below is satisfied:

$$12.0 < vdp - vdn < 50.0 \qquad (3'), \text{where}$$

vdp: the average value of the Abbe number with respect to the d-line of positive lenses included in the fifth lens group, and
vdn: the average value of the Abbe number with respect to the d-line of negative lenses included in the fifth lens group.

12. The projection zoom lens of claim 11, wherein conditional expression (3") below is satisfied:

$$14.0 < vdp - vdn < 40.0 \qquad (3'').$$

13. A projection type display device comprising
a light source;
a light valve which light from the light source enters; and
the projection lens of claim 1 which projects optical images generated by light modulated by the light valve onto a screen.

* * * * *